United States Patent
Lee et al.

(10) Patent No.: US 11,616,869 B2
(45) Date of Patent: Mar. 28, 2023

(54) ELECTRONIC DEVICE AND METHOD FOR CONTROLLING OPERATION MODE BASED ON STATE OF ELECTRONIC DEVICE

(71) Applicant: Samsung Electronics Co., Ltd., Suwon-si (KR)

(72) Inventors: Seungeun Lee, Suwon-si (KR); Hyewon Seo, Suwon-si (KR); Seungnyun Kim, Suwon-si (KR); Jeongmin Park, Suwon-si (KR); Dugjin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/996,240

(22) Filed: Aug. 18, 2020

(65) Prior Publication Data

US 2021/0058503 A1 Feb. 25, 2021

(30) Foreign Application Priority Data

Aug. 20, 2019 (KR) ........................ 10-2019-0101588

(51) Int. Cl.
*H04M 1/02* (2006.01)
(52) U.S. Cl.
CPC ....... *H04M 1/0268* (2013.01); *H04M 1/0214* (2013.01)
(58) Field of Classification Search
CPC .......................... H04M 1/0268; H04M 1/0214
See application file for complete search history.

(56) References Cited

U.S. PATENT DOCUMENTS

| | | | |
|---|---|---|---|
| 9,412,341 B2 * | 8/2016 | Lin | G09G 5/14 |
| 10,180,704 B1 * | 1/2019 | Stewart | G06F 1/1652 |
| 10,191,511 B2 | 1/2019 | Kang et al. | |

(Continued)

FOREIGN PATENT DOCUMENTS

| | | |
|---|---|---|
| CN | 109981839 A | 7/2019 |
| EP | 3 674 873 A1 | 7/2020 |

(Continued)

OTHER PUBLICATIONS

International Search Report dated Nov. 25, 2020, issued in International Patent Application No. PCT/KR2020/010886.

(Continued)

*Primary Examiner* — Lewis G West
(74) *Attorney, Agent, or Firm* — Jefferson IP Law, LLP

(57) ABSTRACT

An electronic device is provided. The electronic device includes a sensor circuit, a display, a processor operationally connected to the sensor circuit and the display, and a memory operationally connected to the processor, wherein the processor may detect, via the sensor circuit, whether the electronic device is unfolded at a predetermined angle, detect a placement state of the electronic device via the sensor circuit when the electronic device is unfolded at the predetermined angle, when the detected placement state of the electronic device is a first state, control the electronic device to operate in a first operation mode corresponding to the first state, and when the detected placement state of the electronic device is a second state, control the electronic device to operate in a second operation mode corresponding to the second state.

21 Claims, 15 Drawing Sheets

(56) References Cited

U.S. PATENT DOCUMENTS

| | | | | |
|---|---|---|---|---|
| 10,491,725 B1* | 11/2019 | Harmon | | H04M 1/0268 |
| 10,761,799 B2 | 9/2020 | Disano et al. | | |
| 10,809,962 B2 | 10/2020 | Files et al. | | |
| 11,360,728 B2* | 6/2022 | Kim | | G06F 3/04883 |
| 11,398,158 B2* | 7/2022 | Halsey | | G08G 5/003 |
| 2004/0030943 A1* | 2/2004 | Ishidera | | G06F 1/3203 |
| | | | | 713/320 |
| 2013/0201101 A1 | 8/2013 | Niu et al. | | |
| 2014/0049883 A1 | 2/2014 | Kim | | |
| 2014/0306905 A1 | 10/2014 | Kim et al. | | |
| 2014/0328041 A1* | 11/2014 | Rothkopf | | G06F 1/1652 |
| | | | | 361/807 |
| 2015/0062025 A1 | 3/2015 | Lee et al. | | |
| 2015/0227223 A1* | 8/2015 | Kang | | G06F 3/0487 |
| | | | | 345/173 |
| 2015/0325216 A1* | 11/2015 | Park | | G06F 1/16 |
| | | | | 345/634 |
| 2016/0179236 A1* | 6/2016 | Shin | | G06F 1/1652 |
| | | | | 345/173 |
| 2016/0187994 A1* | 6/2016 | La | | G06F 1/1677 |
| | | | | 345/619 |
| 2017/0109011 A1 | 4/2017 | Jiang | | |
| 2017/0123748 A1 | 5/2017 | Kim | | |
| 2018/0039408 A1 | 2/2018 | Cheong et al. | | |
| 2018/0061374 A1* | 3/2018 | Wygonik | | G06F 3/0487 |
| 2018/0091772 A1 | 3/2018 | Han et al. | | |
| 2018/0329672 A1 | 11/2018 | Sadak et al. | | |
| 2019/0306290 A1* | 10/2019 | Lee | | H04M 1/0216 |
| 2020/0021675 A1* | 1/2020 | Cheng | | H04M 1/0214 |
| 2020/0142662 A1* | 5/2020 | Ibrahim | | G06F 1/1652 |
| 2020/0212338 A1* | 7/2020 | Ha | | G09G 5/14 |
| 2020/0264666 A1* | 8/2020 | Itou | | G06F 3/0487 |
| 2020/0310492 A1* | 10/2020 | Kim | | G06F 3/04886 |
| 2022/0057866 A1 | 2/2022 | Xu | | |
| 2022/0243521 A1* | 8/2022 | Herman | | B60R 1/06 |
| 2022/0247846 A1* | 8/2022 | Lim | | H04M 1/0216 |

FOREIGN PATENT DOCUMENTS

| | | |
|---|---|---|
| EP | 3 886 415 A1 | 9/2021 |
| EP | 3 896 946 A1 | 10/2021 |
| GN | 109889630 A | 6/2019 |
| JP | 2019-067309 A | 4/2019 |
| KR | 10-2017-0052003 A | 5/2017 |
| KR | 10-2018-0015533 A | 2/2018 |
| KR | 10-1958255 B1 | 3/2019 |

OTHER PUBLICATIONS

Extended European Search Report dated Jan. 17, 2022, issued in European Patent Application No. 20855304.0.

European Office Action dated Feb. 9, 2023, issued in European Patent Application No. 20855304.0.

* cited by examiner

FIG. 6
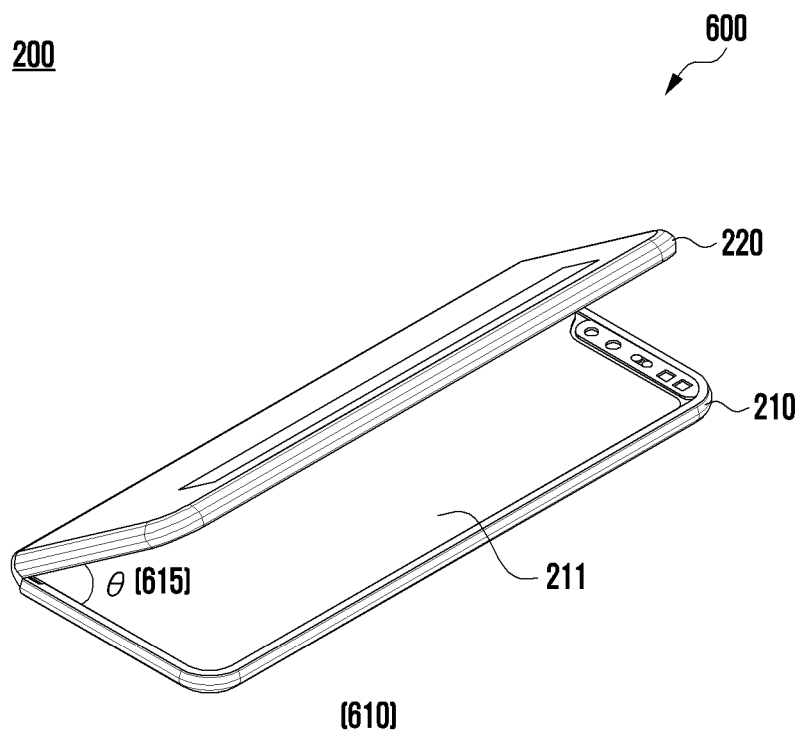
[610]
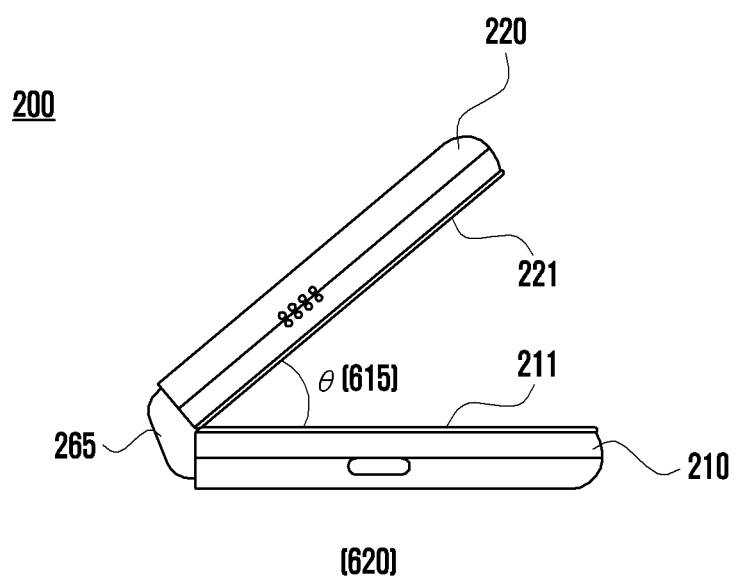
[620]

FIG. 7
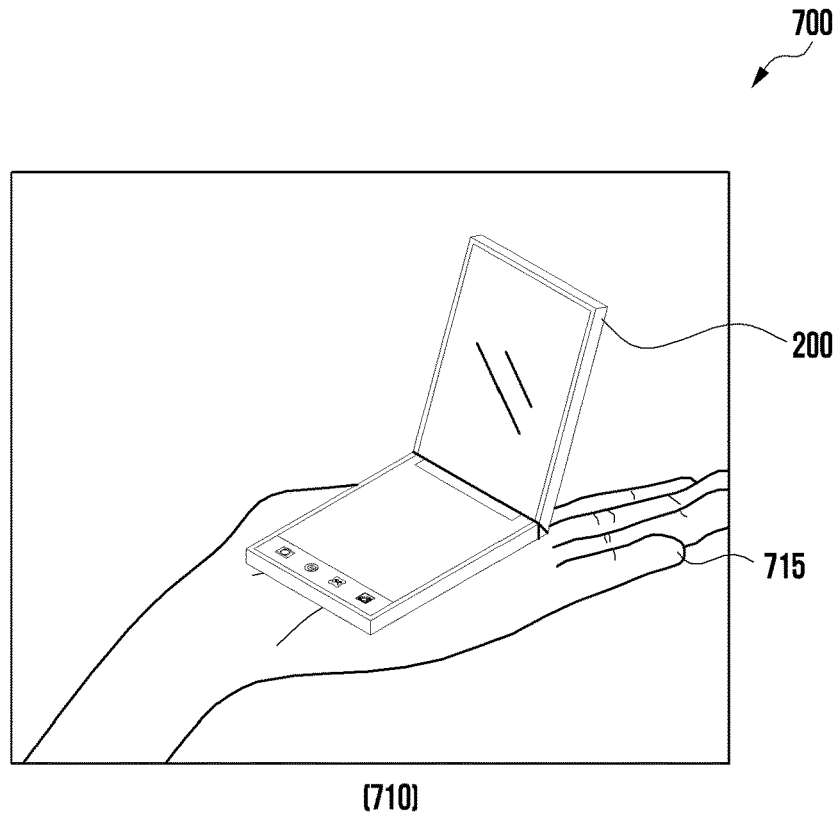
(710)
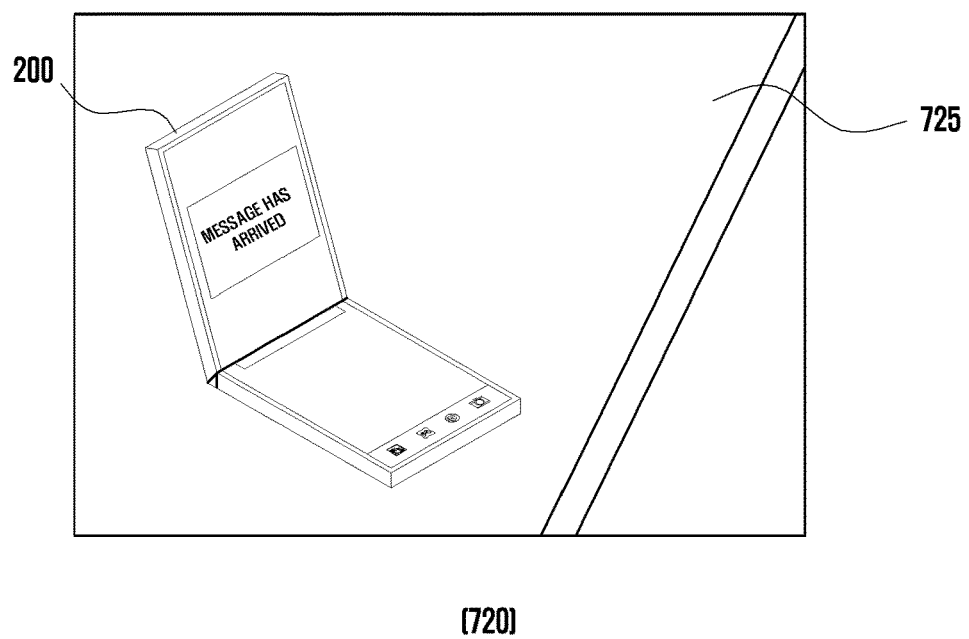
(720)

ELECTRONIC DEVICE AND METHOD FOR CONTROLLING OPERATION MODE BASED ON STATE OF ELECTRONIC DEVICE

CROSS-REFERENCE TO RELATED APPLICATION(S)

This application is based on and claims priority under 35 U.S.C. § 119(a) of a Korean patent application number 10-2019-0101588, filed on Aug. 20, 2019, in the Korean Intellectual Property Office, the disclosure of which is incorporated by reference herein in its entirety.

BACKGROUND

1. Field

The disclosure relates to an electronic device and a method for controlling an operation mode, based on a state of an electronic device.

2. Description of Related Art

Recently, in order to increase portability of an electronic device, a display has been developed in a completely foldable form advanced beyond a flexible form. The state of such a foldable display may include a folded state (e.g., being completely folded), an unfolded state (e.g., being completely unfolded), and a state in which the foldable display is unfolded at a predetermined angle. The electronic device including the foldable display enables the use of a large area of display in an unfolded state and can have a reduced total volume in a folded state. Therefore, the electronic device including a foldable display can improve both usability and portability. When a user is not using the electronic device, the user may place the electronic device on a table in the state in which the foldable display is unfolded at a predetermined angle. When the electronic device is placed on the table in the state in which the foldable display is unfolded at a predetermined angle, the user can check a notification related to an event via the exposed display although not using the electronic device.

The above information is presented as background information only to assist with an understanding of the disclosure. No determination has been made, and no assertion is made, as to whether any of the above might be applicable as prior art with regard to the disclosure.

SUMMARY

In order to use an electronic device placed on a table, a user may pick up the electronic device placed on the table. As a result, the placement state of the electronic device is changed, for example, from a state in which the electronic device is placed on the table to a state in which the electronic device is gripped by or placed in the user's hand. When the placement state of the electronic device is changed, the electronic device may operate in an operation mode corresponding to an unchanged placement state rather than an operation mode corresponding to a changed placement state, and thus the user may feel inconvenience in using the electronic device.

An electronic device according to various embodiments may be controlled to operate in different operation modes on the basis of placement states detected while the electronic device is unfolded at a predetermined angle.

Aspects of the disclosure are to address at least the above-mentioned problems and/or disadvantages and to provide at least the advantages described below. Accordingly, an aspect of the disclosure is to provide an apparatus and method for controlling an operation mode, based on a state of an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a sensor circuit, a display, a processor operationally connected to the sensor circuit and the display, and a memory operationally connected to the processor, wherein the processor may be configured to detect, via the sensor circuit, whether the electronic device is unfolded at a predetermined angle, detect a placement state of the electronic device via the sensor circuit when the electronic device is unfolded at the predetermined angle, when the detected placement state of the electronic device is a first state, control the electronic device to operate in a first operation mode corresponding to the first state, and when the detected placement state of the electronic device is a second state, control the electronic device to operate in a second operation mode corresponding to the second state.

In accordance with another aspect of the disclosure, a method for controlling an operation mode based on a state of an electronic device is provided. The method includes detecting, via a sensor circuit, whether the electronic device is unfolded at a predetermined angle, detecting a placement state of the electronic device via the sensor circuit when the electronic device is unfolded at the predetermined angle, when the detected placement state of the electronic device is a first state, controlling the electronic device to operate in a first operation mode corresponding to the first state, and when the detected placement state of the electronic device is a second state, controlling the electronic device to operate in a second operation mode corresponding to the second state.

An electronic device according to various embodiments can recognize the intention of a user to use the electronic device when the placement state of the electronic device is changed, for example, from the state in which the electronic device is placed on a table to the state in which the electronic device is gripped by the user's hand or is placed on the user's hand, and can provide the user with an operation mode corresponding to the recognized intention. Therefore, the user can easily perform functions of the electronic device and can also gain an enhanced experience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a view for describing a state in which an electronic device is unfolded at a predetermined angle according to an embodiment of the disclosure;

FIG. 7 is a view for describing a placement state of an electronic device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
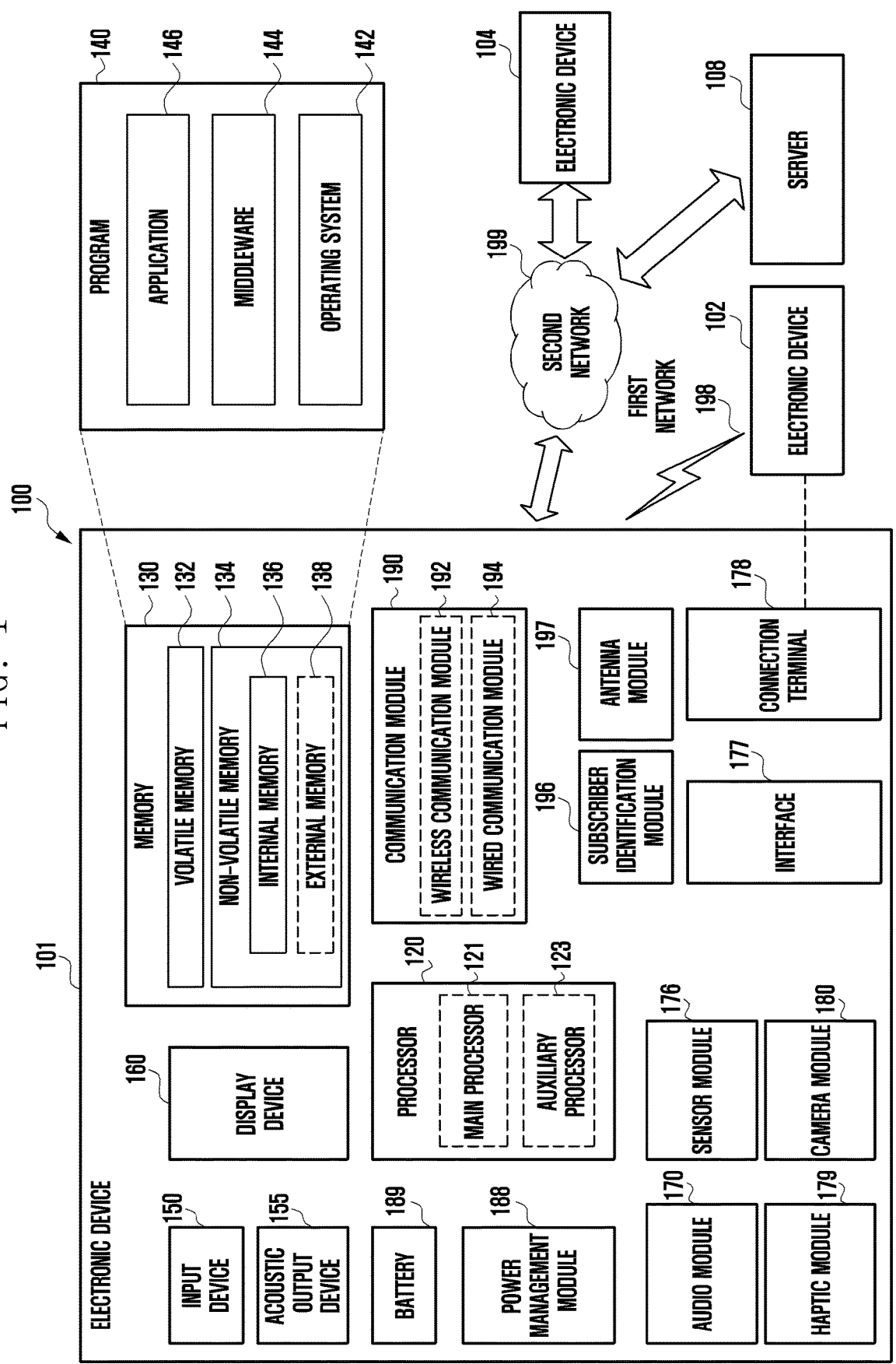
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
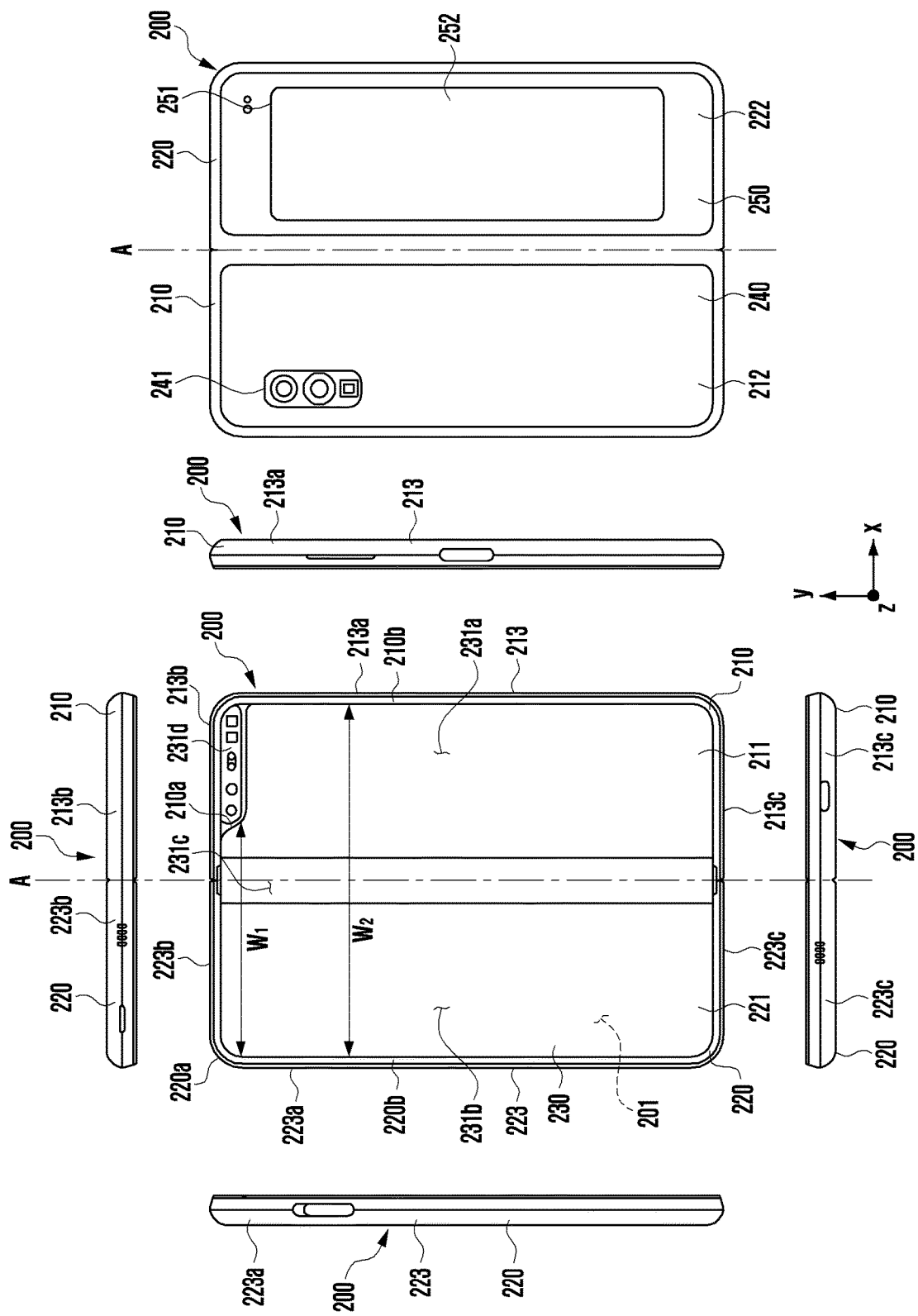
FIG. 2 illustrates an flat state of an electronic device according to an embodiment of the disclosure.

FIG. 2 illustrates a flat state of an electronic device according to an embodiment of the disclosure.

Figure 3:
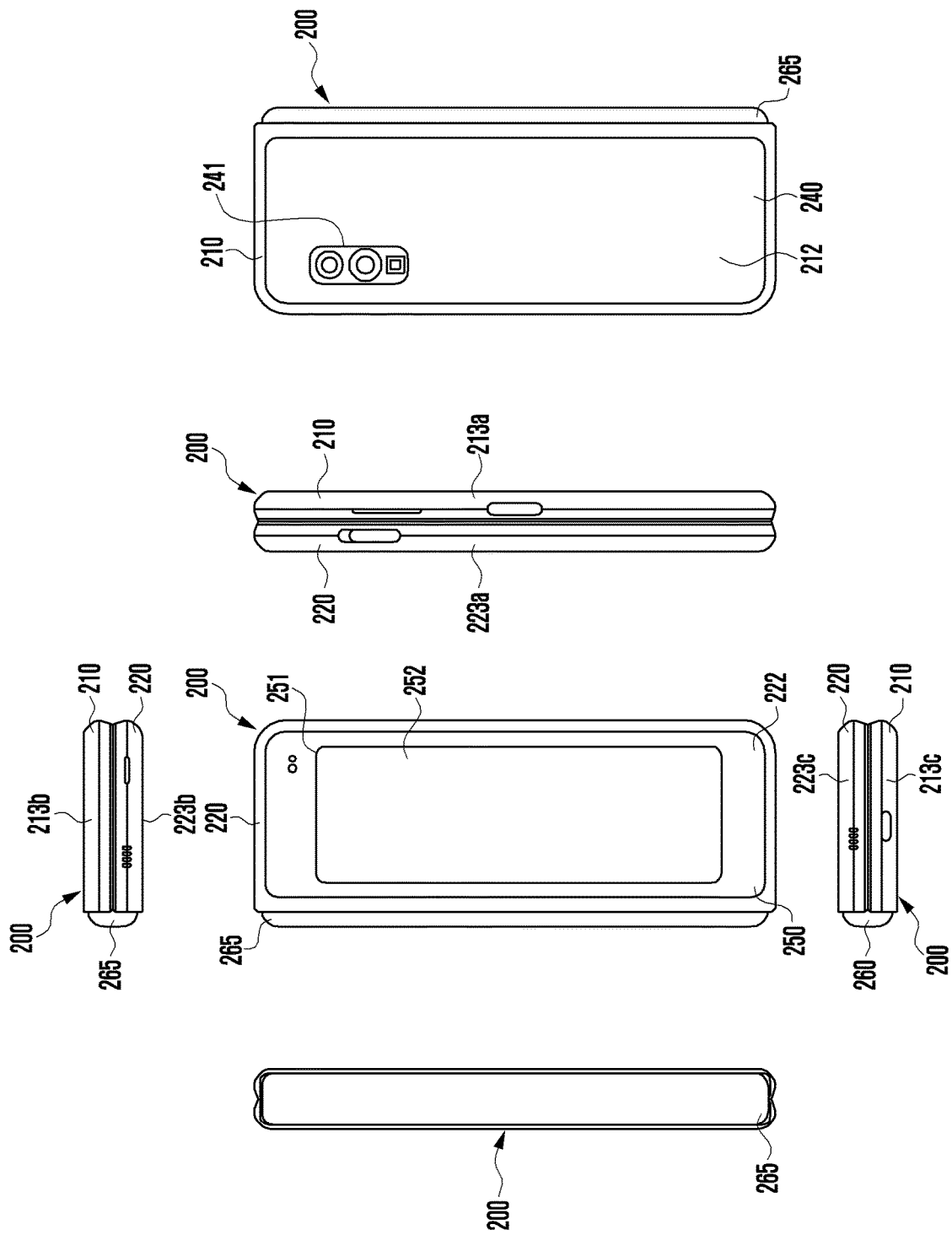
FIG. 3 illustrates a folded state of an electronic device according to an embodiment of the disclosure.

FIG. 3 illustrates a folded state of an electronic device according to an embodiment of the disclosure.

Referring to FIG. 2, an electronic device 200 may include a pair of housing structures 210 and 220 (e.g., a foldable housing structure) that are rotatably combined with each other through a hinge structure (e.g., a hinge structure 264 in FIG. 4), a hinge cover 265 that covers a foldable portion of the pair of housing structures 210 and 220, and display 230 (e.g., a flexible display or a foldable display) that is disposed in a space formed by the pair of housing structures 210 and 220. The display 230 may include a single display or two or more displays. In the disclosure, a surface on which the display 230 is disposed is defined as a front surface (or a first surface) of the electronic device 200, and the opposite surface of the front surface is defined as a rear surface (or a second surface) of the electronic device 200. Also, a surface laterally surrounding a space between the front and rear surfaces is defined as a lateral surface of the electronic device 200.

In an embodiment, the pair of housing structures 210 and 220 may include a first housing structure 210 having a sensor area 231d, a second housing structure 220, a first rear cover 240, and a second rear cover 250. The pair of housing structures 210 and 220 of the electronic device 200 is not limited to the shape and configuration shown in FIGS. 2 and 3, and may be implemented with any other shape and/or configuration. For example, in another embodiment, the first housing structure 210 and the first rear cover 240 may be integrally formed, and also the second housing structure 220 and the second rear cover 250 may be integrally formed.

In an embodiment, the first housing structure 210 and the second housing structure 220 are disposed at both sides with respect to a folding axis (indicated by 'A'), and may have a generally symmetric shape with respect to the folding axis (A). As will be described later, the first and second housing structures 210 and 220 may have different angles or distances therebetween, depending on whether the electronic device 200 is in an unfolded state (also referred to as a flat state or an opening state), a folded state (also referred to as a folding state or closing state), or an intermediate state. In the illustrated embodiment, contrary to the second housing structure 220, the first housing structure 210 has the sensor area 231d in which various sensors are disposed. Excepting this, both housing structures may be symmetrical in shape. In another embodiment, the sensor area 231d may be alternatively or additionally disposed in the second housing structure 220.

In an embodiment, when the electronic device 200 is in the flat state, the first housing structure 210 is connected to the hinge structure (e.g., the hinge structure 264 in FIG. 4) and may include a first surface 211 partially forming the front surface of the electronic device 200 and facing in a first direction, a second surface 212 partially forming the rear surface of the electronic device 200 and facing in a second direction opposite to the first direction, and a first lateral member 213 partially surrounding a space between the first surface 211 and the second surface 212. In an embodiment, the first lateral member 213 may include a first lateral surface 213a disposed in parallel with the folding axis (A), a second lateral surface 213b extended perpendicularly to the folding axis (A) from one end of the first lateral surface 213a, and a third lateral surface 213c extended perpendicularly to the folding axis (A) from the other end of the first lateral surface 213a.

In an embodiment, when the electronic device 200 is in the flat state, the second housing structure 220 is connected to the hinge structure (e.g., the hinge structure 264 in FIG. 4) and may include a third surface 221 partially forming the front surface of the electronic device 200 and facing in a third direction, a four surface 222 partially forming the rear surface of the electronic device 200 and facing in a fourth direction opposite to the third direction, and a second lateral member 223 partially surrounding a space between the third surface 221 and the fourth surface 222. In an embodiment, the second lateral member 213 may include a fourth lateral surface 223a disposed in parallel with the folding axis (A), a fifth lateral surface 223b extended perpendicularly to the folding axis (A) from one end of the fourth lateral surface 223a, and a sixth lateral surface 223c extended perpendicularly to the folding axis (A) from the other end of the fourth lateral surface 223a. In the folded state, the first surface 211 and the third surface 221 may face each other.

In an embodiment, the electronic device 200 may include a recess 201 formed through a structural shape coupling of the first and second housing structures 210 and 220 to accommodate the display 230 therein. The recess 201 may have the substantially same size as the display 230. In an embodiment, the recess 201 may have two or more different widths in a direction perpendicular to the folding axis (A) because of the sensor area 231d. For example, the recess 201 may have a first width ($W_1$) between a first portion 220a of the second housing structure 220 parallel to the folding axis (A) and a first portion 210a of the first housing structure 210 formed at one edge of the sensor area 231d, and a second width ($W_2$) between a second portion 220b of the second housing structure 220 parallel to the folding axis (A) and a second portion 210b of the first housing structure 210 not corresponding to the sensor area 231d and being parallel to the folding axis (A). In this case, the second width ($W_2$) may be greater than the first width ($W_1$). That is, the first portion 210a of the first housing structure 210 and the first portion 220a of the second housing structure 220, which have asymmetrical shapes, form the first width ($W_1$) of the recess 201, whereas the second portion 210b of the first housing structure 210 and the second portion 220b of the second housing structure 220, which have symmetrical shapes, form the second width ($W_2$) of the recess 201. In an embodiment, the first portion 210a and the second portion 210b of the first housing structure 210 may have different distances from the folding axis (A). The width of the recess 201 is not limited to the illustrated example. In various embodiments, the recess 201 may have two or more different widths depending on the shape of the sensor area 231d or asymmetrical shapes of the first and second housing structures 210 and 220.

In an embodiment, at least a portion of the first and second housing structures 210 and 220 may be formed of a metallic or non-metallic material having a selected rigidity value to support the display 230.

In an embodiment, the sensor area 231d may be formed to occupy a certain region adjacent to one corner of the first housing structure 210. The arrangement, shape, and size of the sensor area 231d are not limited to the illustrated example. In another embodiment, the sensor area 231d may be formed at any other corner of the first housing structure 210 or at any position between top and bottom corners. In still another embodiment, the sensor area 231d may be formed in a portion of the second housing structure 220. In yet another embodiment, the sensor area 231d may be formed in a portion of both the first and second housing structures 210 and 220. In an embodiment, components for performing various functions may be embedded in the electronic device 200 and exposed to the front surface of the electronic device 200 through the sensor area 231d or through one or more openings formed in the sensor area 231d. In embodiments, such components may include at least one of a front camera device, a receiver, a proximity sensor, an illuminance sensor, an iris recognition sensor, an ultrasonic sensor, or an indicator.

In an embodiment, the first rear cover 240 may be disposed on the second surface 212 of the first housing structure 210, and may have a substantially rectangular periphery. The periphery may be surrounded, at least in part, by the first housing structure 210. Similarly, the second rear cover 250 may be disposed on the fourth surface 222 of the second housing structure 220, and a substantially rectangular periphery thereof may be surrounded, at least in part, by the second housing structure 220.

In the illustrated embodiment, the first rear cover 240 and the second rear cover 250 may have substantially symmetrical shapes with respect to the folding axis (A). In another embodiment, the first and second rear covers 240 and 250 may have various different shapes. In yet another embodiment, the first rear cover 240 may be integrally formed with the first housing structure 210, and the second rear cover 250 may be integrally formed with the second housing structure 220.

In an embodiment, the first rear cover 240, the second rear cover 250, the first housing structure 210, and the second housing structure 220 may provide together a space in which various components of the electronic device 200 (e.g., a PCB, an antenna module, a sensor module, or a battery) are disposed. In an embodiment, one or more components may be disposed near and visually exposed to the rear surface of the electronic device 200. For example, one or more components or sensors may be visually exposed through a first rear area 241 of the first rear cover 240. In various embodiments, such sensors may include a proximity sensor, a rear camera device, and/or a flash. In another embodiment, at least a portion of a sub display 252 may be visually exposed through a second rear area 251 of the second rear cover 250.

The display 230 may be disposed in a space formed by the pair of housing structures 210 and 220. For example, the display 230 may be mounted in the recess 201 formed by the pair of housing structures 210 and 220 while occupying most of the front surface of the electronic device 200. Therefore, the front surface of the electronic device 200 may include the display 230, a portion (e.g., a periphery) of the first housing structure 210 adjacent to the display 230, and a portion (e.g., a periphery) of the second housing structure 220. In addition, the rear surface of the electronic device 200 may include the first rear cover 240, a portion (e.g., a periphery) of the first housing structure 210 adjacent to the first rear cover 240, the second rear cover 250, and a portion (e.g., a periphery) of the second housing structure 220 adjacent to the second rear cover 250.

In an embodiment, the display 230 may refer to a display that allows at least a portion thereof to be deformed into a curved surface. In an embodiment, the display 230 may include a folding area 231c, a first area 231a disposed on one side (e.g., the right side) with respect to the folding area 231c, and a second area 231b disposed on the other side (e.g., the left side) with respect to the folding area 231c. For example, the first area 231a may be disposed on the first surface 211 of the first housing structure 210, and the second area 231b may be disposed on the third surface 221 of the second housing structure 220. The display 230 may be divided into a plurality of areas (e.g., two, four or more) according to the structure or function thereof. Although, in an embodiment shown in FIG. 2, the display 230 is divided into areas based on the folding area 231c running in parallel with the folding axis (A) corresponding to the y-axis, the display 230 in another embodiment may be divided into areas based on another folding area running in parallel with another folding axis (e.g., corresponding to the x-axis). The above division of the display is merely a virtual division based on the pair of housing structures 210 and 220 and the hinge structure (e.g., the hinge structure 264 in FIG. 4). In practice, regardless of the pair of housing structures 210 and 220 and the hinge structure 264, the display 230 is capable of displaying one full screen. In an embodiment, the first area 231a and the second area 231b may have symmetrical shapes as a whole with respect to the folding area 231c. However, unlike the second area 231b, the first area 231a may have a notch portion (e.g., a notch portion 233 in FIG. 4) cut for exposing the sensor area 231d, resulting in an asymmetrical shape. Thus, strictly, the first and second areas 231a and 231b may have a symmetrical portion and an asymmetrical portion.

Figure 4:
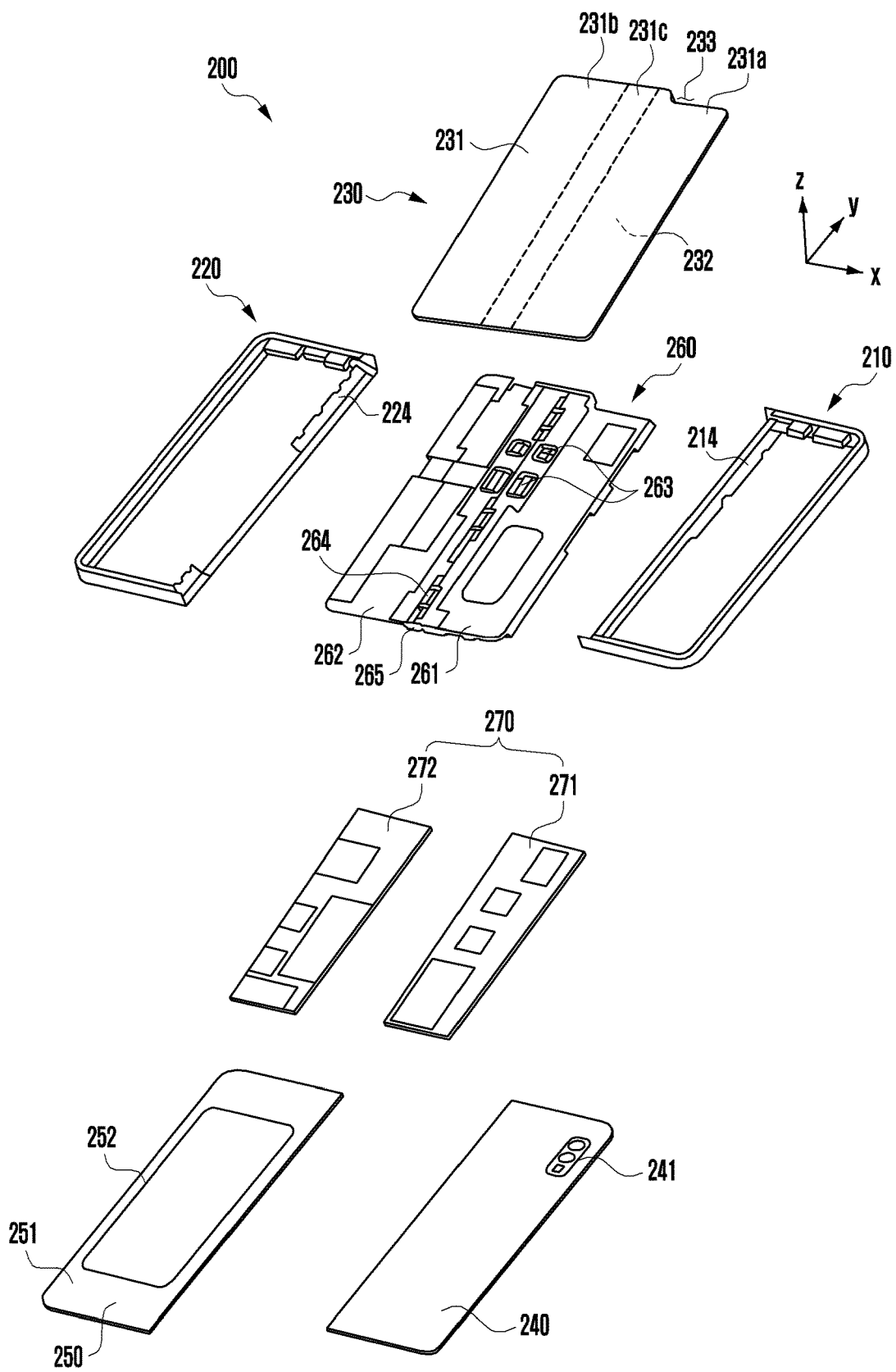
FIG. 4 is an exploded perspective view of an electronic device according to an embodiment of the disclosure.

Referring to FIG. 3, the hinge cover 265 is disposed between the first housing structure 210 and the second housing structure 220 to cover any underlying component (e.g., the hinge structure 264 in FIG. 4). In an embodiment, depending on whether the electronic device 200 is in the flat state or in the folded state, the hinge cover 265 may be hidden by a part of the first and second housing structures 210 and 220 or exposed to the outside.

When the electronic device 200 is in the flat state as shown in FIG. 2, the hinge cover 265 may be hidden by the first and second housing structures 210 and 220, thus being not exposed. When the electronic device 200 is in the folded state (e.g., a completely folded state) as shown in FIG. 3, the hinge cover 265 may be exposed to the outside between the first and second housing structures 210 and 220. When the electronic device 200 is in the intermediate state where the first and second housing structures 210 and 220 are folded with a certain angle, the hinge cover 265 may be partially exposed to the outside between the first and second housing structures 210 and 220. The exposed area in the intermediate state may be smaller than that in the completely folded state. In an embodiment, the hinge cover 265 may have a curved surface.

Hereinafter, in each particular state (e.g., the flat state or the folded state) of the electronic device 200, the operations of the first and second housing structures 210 and 220 and the respective areas of the display 230 will be described.

In an embodiment, when the electronic device 200 is in the flat state (e.g., FIG. 2), the first housing structure 210 and the second housing structure 220 are disposed to form an angle of 180 degrees with each other, and thus the first and second areas 231a and 231b of the display 230 face the same direction. In addition, the folding area 231c may form the same plane as the first and second areas 231a and 231b.

In an embodiment, when the electronic device 200 is in the folded state (e.g., FIG. 3), the first housing structure 210 and the second housing structure 220 are disposed to face each other. Thus, the first and second areas 231a and 231b of the display 230 may form a very small angle (e.g., between 0 and 10 degrees) and face each other. In addition, the folding area 231c may form, at least in part, a curved surface having certain curvature.

In an embodiment, when the electronic device 200 is in the intermediate state, the first housing structure 210 and the second housing structure 220 are disposed to form a certain angle. Thus, the first and second areas 231a and 231b of the display 230 may form a certain angle which is greater than the angle in the folded state and smaller than the angle in the unfolded state. In addition, the folding area 231c may form, at least in part, a curved surface having certain curvature which is smaller than the curvature in the folded state.

FIG. 4 is an exploded perspective view of an electronic device according to an embodiment of the disclosure.

Referring to FIG. 4, in an embodiment, the electronic device 200 may include the first housing structure 210, the second housing structure 220, the display 230, the first rear cover 240, and the second rear cover 250 all of which are described above. The electronic device 200 may further include a bracket assembly 260 and at least one printed circuit board (PCB) 270. The display 230 may be also referred to as a display module, a display assembly, or a display unit.

The display 230 may include a display panel 231 (e.g., a flexible display panel) and at least one plate or layer 232 on which the display panel 231 is mounted. In an embodiment, the plate 232 may be disposed between the display panel 231 and the bracket assembly 260. The display panel 231 may be disposed on one surface of the plate 232. The plate 232 may be formed in a shape corresponding to the display panel 231. For example, a portion of the plate 232 may be formed in a shape corresponding to the notch portion 233 of the display panel 231.

The bracket assembly 260 may include a first bracket 261, a second bracket 262, the hinge structure 264 disposed between the first and second brackets 261 and 262, the hinge cover 265 covering the hinge structure 264 (when viewing the hinge structure 264 from the outside), and at least one wiring member 263 (e.g., a flexible printed circuit board (FPCB)) intersecting with the first and second brackets 261 and 262.

In an embodiment, the bracket assembly 260 may be disposed between the plate 232 and the at least one PCB 270. For example, the first bracket 261 may be disposed between the first area 231a of the display 230 and a first PCB 271, and the second bracket 262 may be disposed between the second area 231b of the display 230 and a second PCB 272.

In an embodiment, the wiring member 263 and the hinge structure 264 may be disposed, at least in part, inside the bracket assembly 260. The wiring member 263 may be disposed in a direction (e.g., the x-axis direction) that crosses the first and second brackets 261 and 262. That is, the wiring member 263 may be disposed in a direction perpendicular to the folding axis (e.g., the y-axis or the folding axis (A) in FIG. 2) of the folding area 231c.

As mentioned above, the at least one PCB 270 may include the first PCB 271 disposed to correspond to the first bracket 261, and the second PCB 272 disposed to correspond to the second bracket 262. The first and second PCBs 271 and 272 may be disposed in a space formed by all of the bracket assembly 260, the first housing structure 210, the second housing structure 220, the first rear cover 240, and the second rear cover 250. On the first and second PCBs 271 and 272, electronic components for implementing various functions of the electronic device 200 may be mounted.

In an embodiment, while the display 230 is combined with the bracket assembly 260, the first housing structure 210 and the second housing structure 220 may be assembled to each other to be combined with both sides of the bracket assembly 260. As described below, the first housing structure 210 and the second housing structure 220 may be combined with the bracket assembly 260 by sliding on both sides of the bracket assembly 260.

In an embodiment, the first housing structure 210 may include a first rotation supporting surface 214, and the second housing structure 220 may have a second rotation supporting surface 224 corresponding to the first rotation supporting surface 214. The first rotation supporting surface 214 and the second rotation supporting surface 224 may include curved surfaces corresponding to curved surfaces included in the hinge cover 265.

In an embodiment, when the electronic device 200 is in the flat state (e.g., FIG. 2), the first and second rotation supporting surfaces 214 and 224 cover the hinge cover 265 so that the hinge cover 265 may not be exposed or may be minimally exposed to the rear surface of the electronic device 200. In addition, when the electronic device 200 is in the folded state (e.g., FIG. 3), the first and second rotation supporting surfaces 214 and 224 rotate along the curved surfaces included in the hinge cover 265 so that the hinge cover 265 may be maximally exposed to the rear surface of the electronic device 200.

In an embodiment, the second display 252 may be mounted on the second rear cover 250 and exposed to the outside through the rear surface of the electronic device 200.

Figure 5:
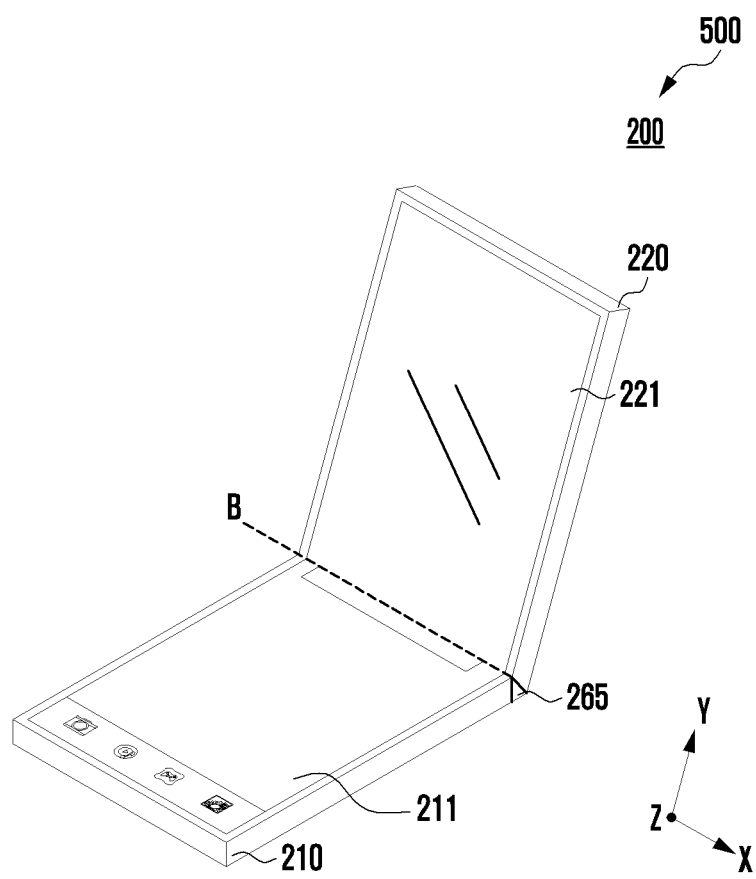
FIG. 5 illustrates an electronic device according to an embodiment of the disclosure.

FIG. 5 is a view illustrating an electronic device according to an embodiment of the disclosure.

In a view 500, the electronic device 200 in FIGS. 2 to 4 according to various embodiments has been described as having a shape in which the first housing structure 210 and the second housing structure 220 are arranged on both sides with reference to a folding axis (axis A) extending in parallel to the Y-axis, and are overall symmetrical with respect to the folding axis (axis A). However, the shape of the electronic device 200 is not limited thereto.

Referring to FIG. 5, the electronic device 200 may have a shape in which the first housing structure 210 and the second housing structure 220 are arranged on both sides with reference to a folding axis (axis B) extending in parallel to the X axis, and are overall symmetrical with respect to the folding axis (axis B). For example, a display (e.g., the display 230 in FIG. 2) may include: a first region (e.g., the first region 231*a* in FIG. 2) disposed on one side with reference to the folding axis (axis B) (e.g., a region above the folding axis (axis B)); and a second region (e.g., the second region 231*b* in FIG. 2) disposed on the other side (e.g., a region below the folding axis (axis B)). For example, the first region 231*a* may be disposed on the first surface 211 of the first housing structure 210, and the second region 231*b* may be disposed on the third surface 221 of the second housing structure 220.

In one embodiment, the hinge cover 265 may be disposed between the first housing structure 210 and the second housing structure 220. Further, according to an operation state (e.g., an unfolded state (flat state) or folded state) of the electronic device 200, the hinge cover 265 may be covered by a part of the first housing structure 210 and a part of the second housing structure 220, or may be exposed to the outside.

FIG. 6 is a view for describing a state in which an electronic device is unfolded at a predetermined angle according to an embodiment of the disclosure.

Reference numerals 610 and 620 in FIG. 6 illustrate an intermediate state in which the first housing structure 210 and the second housing structure 220 of the electronic device 200 form a predetermined angle 615 (e.g., θ).

Referring to FIG. 6, in a view 600, a display (e.g., the display 230 in FIG. 2) may include a first region (e.g., the first region 231*a* in FIG. 2) and a second region (e.g., the second region 231*b* in FIG. 2). For example, the first region 231*a* may be disposed on the first surface 211 (e.g., the first surface 211 in FIG. 2) of the first housing structure 210, and the second region 231*b* may be disposed on the third surface 221 (e.g., the third surface 221 in FIG. 2) of the second housing structure 220. When the electronic device 200 is in the intermediate state, the first surface 211 and the third surface 221 of the electronic device 200 may be arranged with the predetermined angle 615 (e.g., θ) therebetween.

In one embodiment, when the electronic device 200 is in the intermediate state, the hinge cover 265 may be at least partially exposed to the outside of the electronic device 200 between the first housing structure 210 and the second housing structure 220.

In one embodiment, the predetermined angle 615 (e.g., θ) may be determined by a sensor circuit, for example, a Hall sensor, based on the movement of a hinge structure (e.g., the hinge structure 264 in FIG. 4).

FIG. 7 is a view for describing a placement state of an electronic device according to an embodiment of the disclosure.

Referring to FIG. 7, in a view 700, a placement of an electronic device (e.g., the electronic device 200 in FIG. 2) may include a first state and a second state.

In one embodiment, the first state may include a state in which the movement of the electronic device 200 is sensed. For example, as illustrated by reference numeral 710, the first state may include a state in which the electronic device 200 is placed on a palm 715 of a user. However, the first state is not limited thereto, and may include a state in which the electronic device 200 is gripped by the user. For example, the state in the electronic device 200 is gripped by the user may include a state in which the electronic device 200 is slantingly gripped (e.g., obliquely gripped while being supported by a part of the palm) or is horizontally gripped.

In one embodiment, the second state may include a state (e.g., a stationary state) in which a movement of the electronic device 200 is not detected. For example, as illustrated by reference numeral 720, the second state may include a state in which the electronic device 200 is placed on a table (or the ground).

In one embodiment, the electronic device 200 may determine whether the placement state of the electronic device 200 is the first state or the second state, based on a measurement value measured using a sensor circuit (e.g., a sensor circuit 820 in FIG. 8), for example, at least one of a gyro sensor or an acceleration sensor. For example, the electronic device 200 may determine whether the placement state of the electronic device 200 is the first state or the second state, based on a z-axis value of the sensor circuit, for example, the acceleration sensor. When the electronic device 200 is placed on the table (e.g., the ground) (for example, when the electronic device 200 is in the second state), the z-axis value of the acceleration sensor may be detected as 1 G, and x-axis and y-axis values of the acceleration sensor may be detected as zero (0). When the electronic device 200 placed on the floor is lifted up, the z-axis acceleration sensor value of 1 G may instantly become close to zero (0), or may become smaller than 1 G. The electronic device 200 may determine whether the placement state of the electronic device 200 is the first state or the second state, based on a change in the z-axis acceleration sensor value.

In another embodiment, the electronic device 200 may determine the lifting-up of the electronic device by using the sensor circuit, for example, a barometer sensor. After the electronic device 200 is determined to have been lifted up, the electronic device 200 may determine whether the electronic device 200 is in an on-hand state. For example, when the electronic device 200 is placed on the palm or gripped by the hand, a movement pattern similar to that in the state in which the electronic device is placed on the table (or the ground) may be detected. However, when the electronic device 200 is placed on the palm or gripped by the hand, a minute movement may be detected according to the sensitivity of the acceleration sensor. For example, even when a user of the electronic device 200 seems to keep still, a minute movement due to a heartbeat may be detected although remaining unseen. For example, the placement state (e.g., the first state or the second state) of the electronic device 200 may be detected via the acceleration sensor by using an algorithm for predicting a heartbeat. The state in which the minute movement is detected may include a sedentary state (e.g., a state in which small usual movement, other than movement such as walking or traveling, can be detected) in which a user does not make a significant movement but is not in a completely stationary state. In other words, an operation of detecting the sedentary state and the completely stationary state may become a reference for determining whether the placement state of the electronic device 200 is the first state, for example, the state in which the electronic device 200 is placed on the palm, or the second state, for example, the state in which the electronic device 200 is placed on the table.

In one embodiment, the electronic device 200 may be controlled to operate in different modes based on the placement state of the electronic device 200. A detailed description thereof will be made with reference to FIG. 9.

Figure 8:
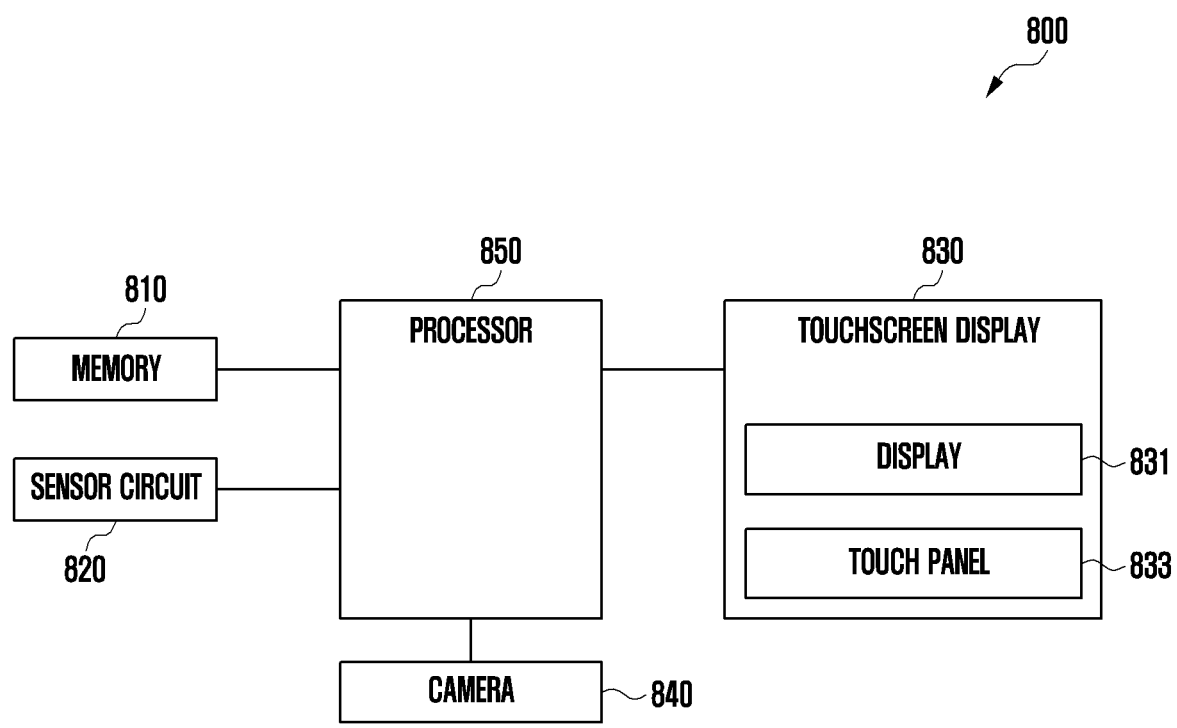
FIG. 8 is a block diagram illustrating an electronic device according to an embodiment of the disclosure.

FIG. 8 is a block diagram illustrating an electronic device according to an embodiment of the disclosure.

Referring to FIG. 8, in diagram 800, the electronic device 200 (e.g., the electronic device 101 in FIG. 1) may include a memory 810 (e.g., the memory 130 in FIG. 1), a sensor circuit 820 (e.g., the sensor module 176 in FIG. 1), a touchscreen display 830 (e.g., the display device 160 in FIG. 1 and the display 230 in FIG. 2), a camera 840 (e.g., the camera module 180 in FIG. 1), and a processor 850 (e.g., the processor 120 in FIG. 1).

According to one embodiment, the memory 810 (e.g., the memory 130 in FIG. 1) may store a reference value for detecting a state (e.g., an intermediate state) in which the electronic device 200 is unfolded at a predetermined angle. The memory 810 may store a sensor value for determining the placement state (a first state or a second state) of the electronic device 200 (e.g., a sensor value for determining the completely stationary state and the sedentary state of the electronic device 200). The memory 810 may store a program for controlling the electronic device 200 to operate in an operation mode (e.g., a first operation mode or a second operation mode) determined based on whether the electronic device 200 is unfolded at a predetermined angle and the placement state of the electronic device 200. When the electronic device 200 is unfolded at the predetermined angle, the memory 810 may store a program for controlling the electronic device 200 to operate in an operation mode determined based on a designated angle range including the predetermined angle and the placement state of the electronic device 200.

According to one embodiment, the sensor circuit 820 (e.g., the sensor module 176 in FIG. 1) may detect whether the electronic device 200 is unfolded at the predetermined angle and the placement state of the electronic device 200. For example, the sensor circuit 820 may include at least one among a Hall sensor, an acceleration sensor, a gyro sensor, an optical sensor, or a barometer sensor.

According to one embodiment, the touchscreen display 830 (e.g., the display device 160 in FIG. 1) may be integrally formed to include a display 831 and a touch panel 833.

In one embodiment, the touchscreen display 830 may display an image under control of the processor 850, and may be implemented as one among a liquid crystal display (LCD), a light-emitting diode (LED) display, an organic light-emitting diode (OLED) display, a micro electro mechanical systems (MEMS) display, or an electronic paper display. However, the touchscreen display 830 is not limited thereto.

In one embodiment, the display 831 (e.g., the display 230 in FIG. 2) may include a first region (e.g., the first region 231a in FIG. 2) and a second region (e.g., the second region 231b in FIG. 2). For example, the first region 231a may be disposed on the first surface 211 (e.g., the first surface 211 in FIG. 2) of the first housing structure 210, and the second region 231b may be disposed on the third surface 221 (e.g., the third surface 221 in FIG. 2) of the second housing structure 220. In one embodiment, the display 831 may display, under control of the processor 850, a user interface according to a first operation mode or a second operation mode determined based on the state in which the electronic device 200 is unfolded at the predetermined angle and the placement state of the electronic device 200.

In one embodiment, the touch panel 833 may receive, for example, touch, gesture, proximity, or hovering input using a part of the body of a user.

According to one embodiment, after the placement state of the electronic device 200 is determined to be the first state, the camera 840 (e.g., the camera module 180 in FIG. 1) may be driven under control of the processor 850. The camera 840 may detect the user's face in a preview image. In one embodiment, when the placement state of the electronic device 200 is determined to be the first state, the camera 840 may be driven under control of the processor 850 in response to an execution signal for a designated application, for example, an application executable using the camera 840 (e.g., a mirror application, a beauty application, or an AR application).

According to one embodiment, the processor 850 (e.g., the processor 120 in FIG. 1) may control overall operations of the electronic device 200 and a signal flow between internal elements of the electronic device 200, may process data, and may control a supply of power from a battery (e.g., the battery 189 in FIG. 1) to the elements.

In one embodiment, the processor 850 may detect, based on data received via the sensor circuit 820, whether the electronic device 200 is in the state (e.g., the intermediate state in FIG. 6) in which the electronic device 200 is unfolded at the predetermined angle. When the electronic device 200 is unfolded at the predetermined angle, the processor 850 may detect a placement state of the electronic device 200. The placement state of the electronic device 200 may include the first state and the second state. The processor 850 may determine whether a movement of the electronic device 200 is detected, based on sensing information obtained via the sensor circuit 820, for example, at least one among the gyro sensor, the acceleration sensor, or the barometer sensor. According to whether the movement of the electronic device 200 is detected, the processor 850 may detect whether the placement state of the electronic device 200 is the first state (e.g., reference numeral 710 in FIG. 7) or the second state (e.g., reference numeral 720 in FIG. 7).

In one embodiment, when the placement state of the electronic device 200 is the first state, the processor 850 may control the electronic device 200 to operate in a first operation mode corresponding to the first state, and when the placement state of the electronic device 200 is the second state, the processor 850 may control the electronic device 200 to operate in a second operation mode corresponding to the second state. For example, the processor 850 may execute applications differently configured for the first operation mode and the second operation mode, and may control the electronic device 200 to operate based on a configuration value of the electronic device 200 and/or a layout of a user interface to be output on the display 230 (e.g., the first region 231a and/or the second region 231b of the display 230).

In another embodiment, after the placement state of the electronic device 200 is determined to be the first state, the processor 850 may further perform obtaining the distance between the electronic device 200 and a user of the electronic device 200 via the sensor circuit 820, for example, the optical sensor. When the obtained distance between the electronic device 200 and the user of the electronic device 200 is included in a designated range, the processor 850 may control the electronic device 200 to operate in the first operation mode corresponding to the first state.

In another embodiment, after the placement state of the electronic device 200 is determined to be the first state, the processor 850 may drive the camera 840 to further perform determining whether the face of the user of the electronic device 200 is detected. When the face of the user of the electronic device 200 is detected via the camera 840, the processor 850 may control the electronic device 200 to operate in the first operation mode corresponding to the first state.

In another embodiment, when the electronic device 200 is unfolded at the predetermined angle, the processor 850 may detect an angle formed by the first surface (e.g., the first surface 211 in FIG. 2) and the third surface (e.g., the third surface 221 in FIG. 2) of the electronic device 200. The processor 850 may control the electronic device 200 to operate in a pertinent operation mode based on the detected angle and the placement state of the electronic device 200.

Figure 9:
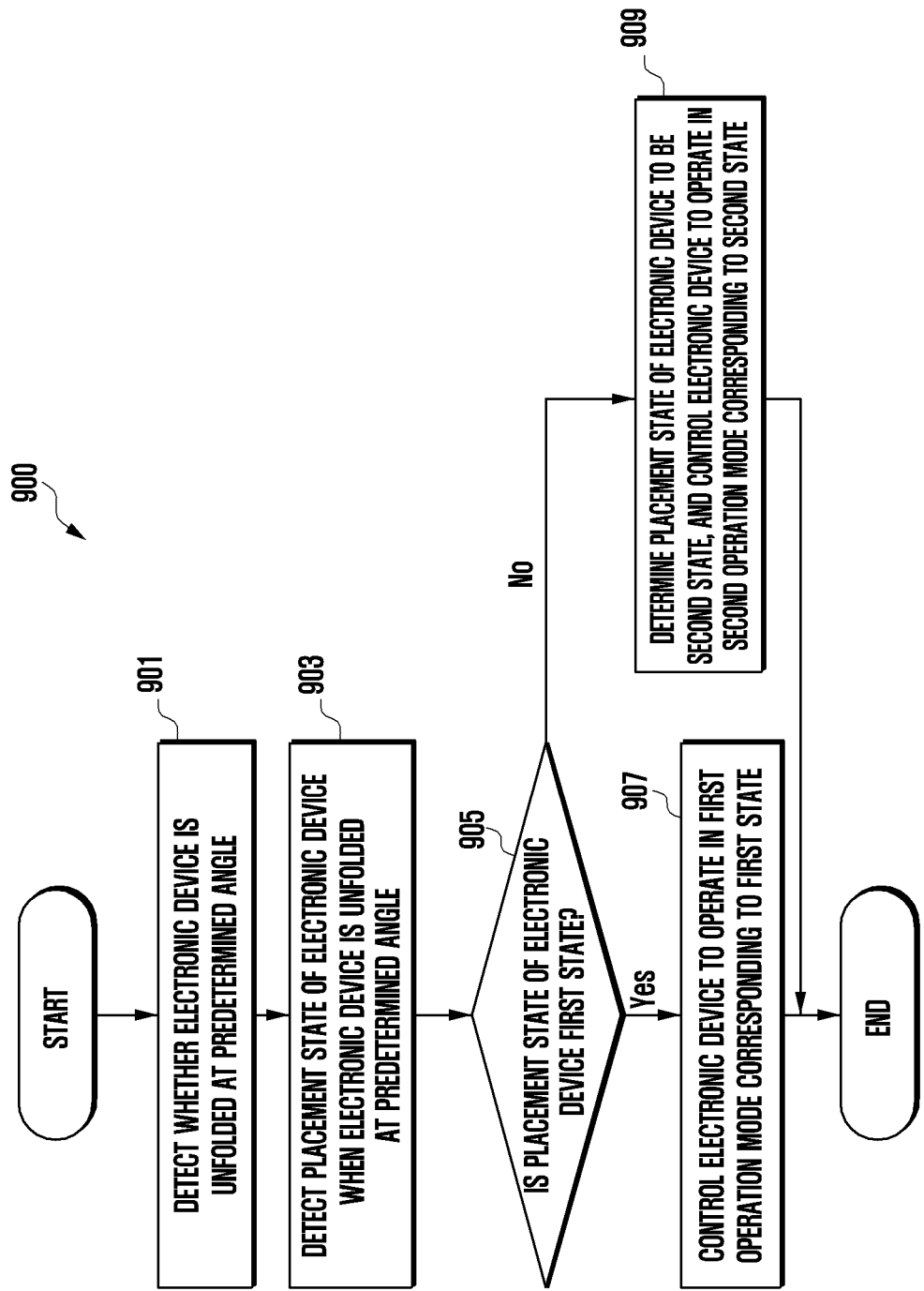
FIG. 9 is a flowchart for describing a method in which an electronic device operates in an operation mode determined based on a state in which the electronic device is unfolded at a predetermined angle and a placement state of the electronic device according to an embodiment of the disclosure.

FIG. 9 is a flowchart for describing a method in which an electronic device operates in an operation mode determined based on a state in which the electronic device is unfolded at a predetermined angle and a placement state of the electronic device, according to an embodiment of the disclosure.

Referring to FIG. 9, in a method 900, in operation 901, the electronic device 200 may detect whether the electronic device 200 is unfolded at a predetermined angle. For example, on the basis of data received from a sensor circuit (e.g., the sensor circuit 820 in FIG. 8), the electronic device 200 may determine an angle that a first surface (e.g., the first surface 211 in FIG. 2), on which a first region (e.g., the first region 231a in FIG. 2) of a display (e.g., the display 230 in FIG. 2) is disposed, forms with a third surface (e.g., the third surface 221 in FIG. 2) on which a second region (e.g., the second region 231b in FIG. 2) of the display is disposed. The electronic device 200 may detect, based on the determined angle, whether the electronic device 200 is unfolded at the predetermined angle (e.g., whether the electronic device 200 is in an intermediate state in which the first housing structure 210 and the second housing structure 220 in FIG. 2 form a predetermined angle (e.g., θ 615)).

In one embodiment, when the electronic device 200 is unfolded at the predetermined angle, in operation 903, the electronic device 200 may detect a placement state of the electronic device 200. The placement state of the electronic device 200 may include a first state (e.g., a sedentary state) and a second state (e.g., a completely stationary state). For example, the electronic device 200 may obtain sensing information via the sensor circuit 820, for example, at least one among a gyro sensor, an acceleration sensor, or a barometer sensor. The electronic device 200 may determine, based on the obtained sensing information, whether a movement of the electronic device 200 is detected. On the basis of whether the movement of the electronic device 200 is detected, the electronic device 200 may determine whether the placement state of the electronic device 200 is the first state or the second state.

In one embodiment, the first state may include a state in which the movement of the electronic device 200 is detected. For example, as illustrated by reference numeral 710 in FIG. 7, the first state may include a state in which the electronic device 200 is placed on the palm (e.g., the palm 715 in FIG. 7) of a user or a state in which the electronic device 200 is gripped by the user (e.g., a part of the side surface of the electronic device 200 (e.g., the lower end of the electronic device 200) is gripped).

In one embodiment, the second state may include a state in which the movement of the electronic device 200 is not detected. For example, as illustrated by reference numeral 720 in FIG. 7, the second state may include a state in which the electronic device 200 is placed on a table (e.g., the table 725 (or the ground) in FIG. 7).

In one embodiment, the electronic device 200 may be controlled to operate in different modes based on the placement state (e.g., the first state or second state) of the electronic device 200. For example, the operation modes may include at least one among an application to be executed, a configuration value of the electronic device 200, or a layout of a user interface to be output. A detailed description thereof will be made in connection with operations 905 to 909 below.

In one embodiment, in operation 905, the electronic device 200 may determine whether the placement state of the electronic device 200 is the first state. When the placement state of the electronic device 200 is the first state, in operation 907, the electronic device 200 may be controlled to operate in a first operation mode corresponding to the first state. For example, when the placement state of the electronic device 200 is the first state, for example, when the electronic device 200 is placed on the palm (e.g., the palm 715 in FIG. 7) of a user or is gripped by the hand of the user, the electronic device 200 may recognize that the user attempts to use the electronic device 200. The electronic device 200 may operate in the first operation mode corresponding to the first state, for example, may execute a designated application, may change a configuration value of the electronic device 200 (e.g., may change touch sensitivity or vibration sensitivity), and/or may change a layout of a user interface to be output on the display 230 (e.g., the first region 231a and/or the second region 231b of the display 230).

For example, the electronic device 200 may execute a designated application corresponding to the first state. The designated application corresponding to the first state may include at least one among a mirror application, a beauty application, or an AR application, which can be executed using a camera when the electronic device 200 and the user of the electronic device 200 approach each other. In another example, the electronic device 200 may display a shortcut icon of the designated application such that the designated application can be executed. In another example, when there are multiple designated applications, the electronic device 200 may provide a list including the multiple designated applications.

In one embodiment, the configuration value of the electronic device 200 may include touch sensitivity and vibration sensitivity. When the electronic device 200 is placed on the palm 715 of the user, the electronic device 200 is positioned on an uneven place, and thus touch input may be unstable compared with when the electronic device 200 is placed on the table. For example, the unstable state may include the case in which the accuracy of touch input is reduced due to the movement of the electronic device 200, or the intensity of touch input is weak. When the placement state of the electronic device 200 is the first state, the electronic device 200 may configure the touch sensitivity to be higher than a touch sensitivity corresponding to the second state such that touch input can be accurately recognized.

In one embodiment, in the state in which the electronic device 200 is placed on the palm 715, when a vibration is output with the reception of an event (e.g., a message or a phone call), the user may be surprised and thus drop the electronic device 200. When the placement state of the electronic device 200 is the first state, the electronic device 200 may configure the vibration sensitivity to be lower than a vibration sensitivity corresponding to the second state such that a vibration is weakly output, or may configure a silent mode. In another example, when an event (e.g., a message or phone call) is received, the electronic device 200 may provide the reception of the event through a visual notification and/or a sound notification, instead of outputting a vibration.

In one embodiment, when a first rear cover (e.g., the first rear cover 240 in FIG. 2) of the electronic device 200 comes into contact with the palm 715, the electronic device 200 may display an input-related layout in the first region 231a of the display 230, disposed in a first surface (e.g., the first surface 211 in FIG. 2) of a first housing structure (e.g., the first housing structure 210) in which the first rear cover 240 is disposed, and may display an output-related layout in the second region 231b of the display 230. In another embodiment, when a second rear cover (e.g., the second rear cover 250 in FIG. 2) of the electronic device 200 comes into contact with the palm 715, the electronic device 200 may display an input-related layout in the second region 231b of the display 230, disposed in a second housing structure (e.g., the second housing structure 220 in FIG. 2) in which the second rear cover 250 is disposed, and may display an output-related layout in the first region 231a of the display 230. The input-related layout may include a keyboard layout, and the output-related layout may include a layout including an input field, for example, a message-writing screen layout. According to one embodiment, the reason for displaying an input-related layout in a display region disposed in the housing structure of the rear cover of the electronic device 200 coming into contact with the palm 715 is that the electronic device 200 is supported by the palm and thus a user input (e.g., a touch input) can be accurately recognized in a stable state.

In one embodiment, when the placement state of the electronic device 200 is not the first state, in operation 909, the electronic device 200 may determine that the placement state of the electronic device 200 is the second state, and may be controlled to operate in a second operation mode corresponding to the second state. For example, unlike when operating in the first operation mode, the electronic device 200 may execute a designated application corresponding to the second state, may change a configuration value (e.g., touch sensitivity and vibration sensitivity), and/or may change a layout of a user interface to be output on the display 230 (e.g., the first region 231a and/or the second region 231b).

According to various embodiments, the electronic device 200 is controlled to operate in different operation modes depending on a placement state detected while the electronic device 200 is unfolded at the predetermined angle. Therefore, even when the state switches (e.g., switches from the first state to the second state or switches from the second state to the first state), a user may easily perform functions of the electronic device in an operation mode suitable for the provided state without inconvenience due to state switching.

Figure 10:
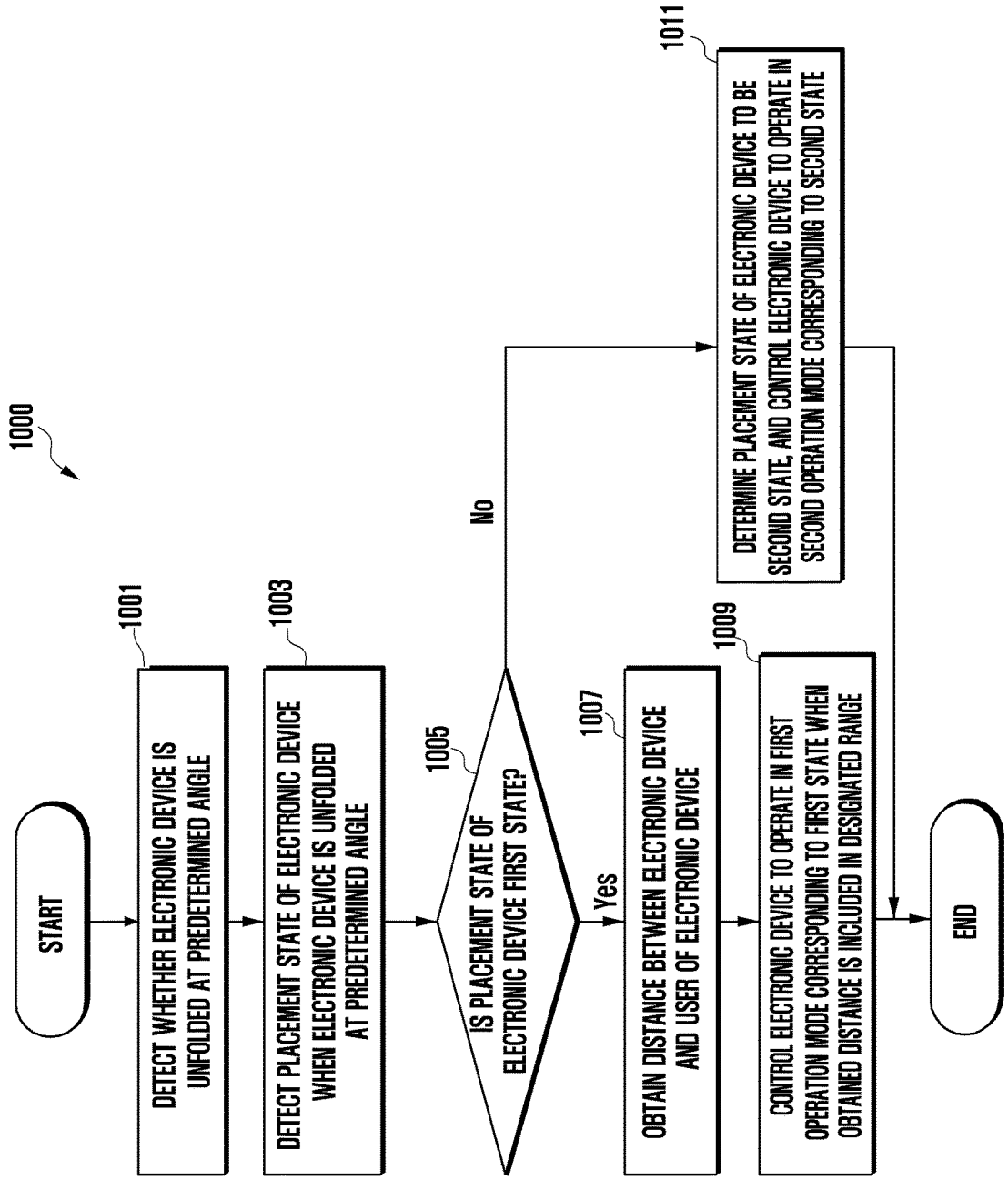
FIG. 10 is a flowchart for describing a method in which an electronic device operates in an operation mode determined based on a state in which the electronic device is unfolded at a predetermined angle, a placement state of the electronic device, and the distance between the electronic device and a user, according to an embodiment of the disclosure.

FIG. 10 is a flowchart for describing a method in which an electronic device operates in an operation mode determined based on a state in which the electronic device is unfolded at a predetermined angle, a placement state of the electronic device, and the distance between the electronic device 200 and a user, according to an embodiment of the disclosure.

According to one embodiment, since operations 1001 to 1005 in FIG. 10 are identical to operations 901 to 905 in FIG. 9, a detailed description thereof will be replaced with the description related to FIG. 9.

Referring to FIG. 10, in a method 1000, in operation 1001, the electronic device 200 may detect whether the electronic device 200 is unfolded at a predetermined angle. For example, as described in FIG. 6, the electronic device 200 may detect whether the electronic device 200 is in an intermediate state in which a first housing structure (e.g., the first housing structure 210 in FIG. 2) and a second housing structure (e.g., the second housing structure 220 in FIG. 2) of the electronic device 200 form a predetermined angle (e.g., θ 615).

In one embodiment, when the electronic device 200 is unfolded at the predetermined angle, in operation 1003, the electronic device 200 may detect a placement state of the electronic device 200. The placement state of the electronic device 200 may include: a first state (e.g., reference numeral 710 in FIG. 7) in which a movement of the electronic device 200 is detected; and a second state (e.g., reference numeral 720 in FIG. 7) in which the movement of the electronic device 200 is not detected.

In one embodiment, in operation 1005, the electronic device 200 may determine whether the placement state of the electronic device 200 is the first state. When the placement state of the electronic device 200 is the first state, in operation 1007, the electronic device 200 may obtain the distance between the electronic device 200 and a user of the electronic device 200.

For example, the electronic device 200 may obtain the distance between the electronic device 200 and the user of the electronic device 200 via a sensor circuit (e.g., the sensor circuit 820 in FIG. 8), for example, an optical sensor. The optical sensor may include a proximity sensor, an image sensor, and/or a time-of-flight (ToF) sensor. The optical sensor may include an emitter and a receiver. The emitter may emit visible light and/or an IR. The receiver may sense light which has been emitted from the emitter, has reached and been reflected by an external object (e.g., the user of the electronic device 200), and has then been incident. The electronic device 200 may obtain the distance between the electronic device 200 and the user of the electronic device 200 based on a time difference or a light amount when the receiver receives light which has been emitted from the emitter and has reached and then been reflected by the external object.

In one embodiment, in operation 1009, the electronic device 200 may be controlled to operate in a first operation mode corresponding to the first state when the obtained distance between the electronic device 200 and the user of the electronic device 200 is included in a designated range.

In one embodiment, when the placement state of the electronic device 200 is not the first state, in operation 1011, the electronic device 200 may determine that the placement state of the electronic device 200 is the second state, and may be controlled to operate in a second mode corresponding to the second state.

Although not illustrated, when the distance between the electronic device 200 and the user of the electronic device 200, obtained in operation 1007, is not included in the designated range, the electronic device 200 may be controlled to perform operation 1011, for example, to operate in the second mode corresponding to the second state.

Figure 11:
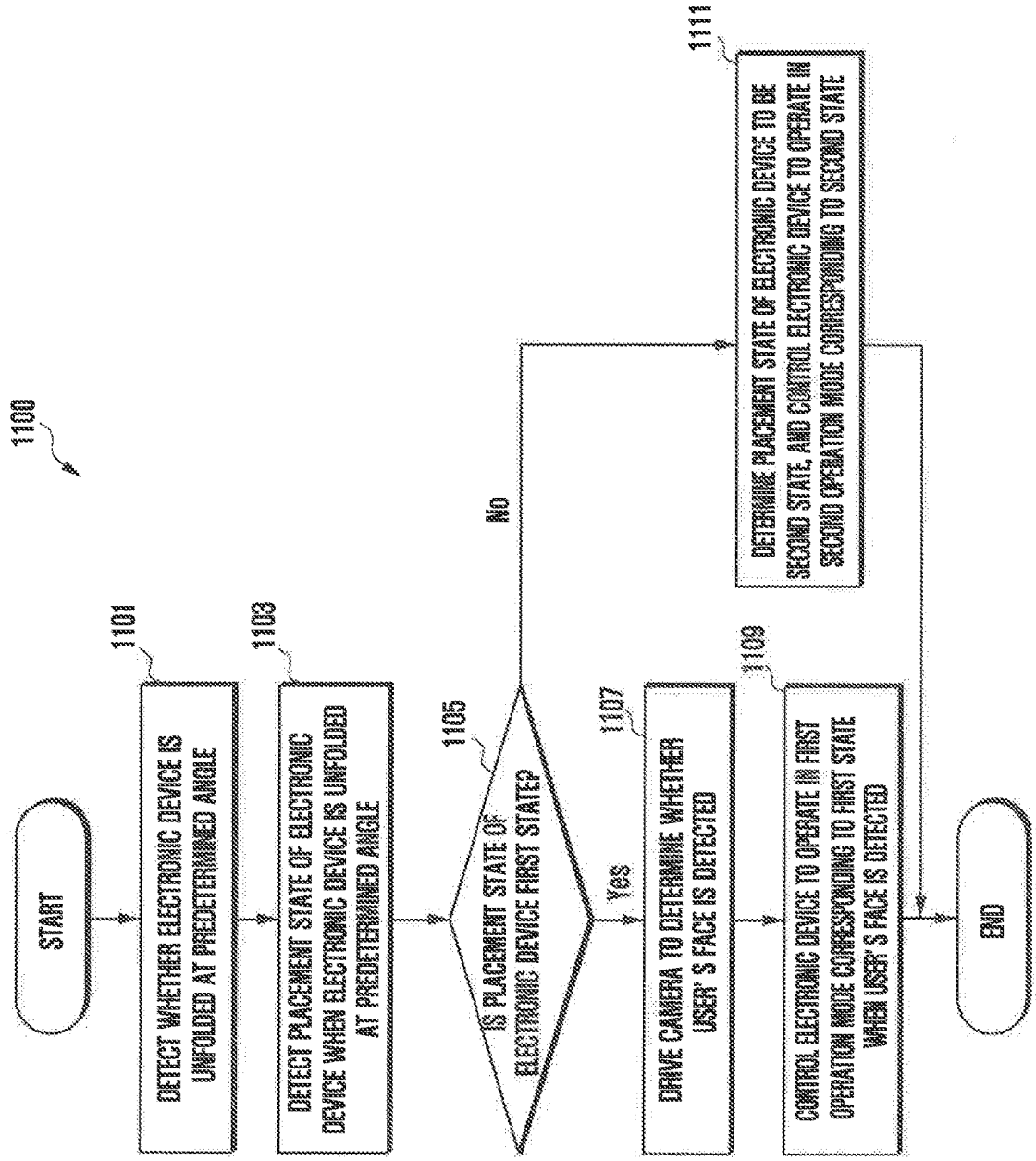
FIG. 11 is a flowchart for describing a method in which an electronic device operates in an operation mode determined based on a state in which the electronic device is unfolded at a predetermined angle, a placement state of the electronic device, and whether a user's face is detected, according to an embodiment of the disclosure.

FIG. 11 is a flowchart for describing a method in which an electronic device operates in an operation mode determined based on a state in which the electronic device is unfolded at a predetermined angle, a placement state of the electronic device, and whether a user's face is detected, according to an embodiment of the disclosure.

According to one embodiment, since operations 1101 to 1105 and 1111 in FIG. 11 are identical to operations 901 to 905 and 909 in FIG. 9 described above, only operations in FIG. 11 different from those in FIG. 9 will be described.

Referring to FIG. 11, in a method 1100, when the placement state of the electronic device 200 is determined to be a first state in operation 1105, the electronic device 200 may drive, in operation 1107, a camera (e.g., the camera 840 in FIG. 8) to determine whether the face of a user of the electronic device 200 is detected. For example, the electronic device 200 may determine, via the camera 840, whether at least a part (for example, the eyes, the nose, and/or the mouth) of the face of the user is detected. Although not illustrated, in another embodiment, the electronic device 200 may perform detecting the direction of the user's line-of-sight via the camera 840. For example, the electronic device 200 may detect the direction of the user's line-of-sight by recognizing (or tracking) the line-of-sight on the basis of the movement of an eyeball. In another example, the electronic device 200 may detect the direction of the user's line-of-sight, based on the direction of the user's face.

In one embodiment, when the face of the user of the electronic device 200 is detected via the driven camera 840, in operation 1109, the electronic device 200 may be controlled to operate in a first operation mode corresponding to the first state. For example, when at least a part (e.g., the eyes, the nose, and/or the mouth) of the user's face is detected via the camera 840, and/or when it is determined that the user's line-of-sight is directed toward a display (e.g., the display 230 in FIG. 2), the electronic device 200 may be controlled to operate in the first operation mode corresponding to the first state.

Although not illustrated, when the face of the user of the electronic device 200 is not detected via the camera 840 in operation 1107, the electronic device 200 may be controlled to operate in a second operation mode corresponding to a second state.

A scenario according to an embodiment of FIG. 11 may include performing another operation by a user in the state in which the electronic device 200 unfolded at a predetermined angle is placed on the palm 715 as illustrated by reference numeral 710 in FIG. 7. For example, the user may not be looking at the display 230 of the electronic device 200. In this case, when the electronic device 200 is placed on the palm 715 of the user and the user's face is at least partially detected via the camera 840, the electronic device 200 may execute the first operation mode corresponding to the first state, for example, a designated application. For example, when the face of the user approaches the electronic device 200 placed on the palm 715, the electronic device 200 may recognize that the user attempts to check the state of the face and may execute a designated application, for example, a mirror application.

Figure 12:
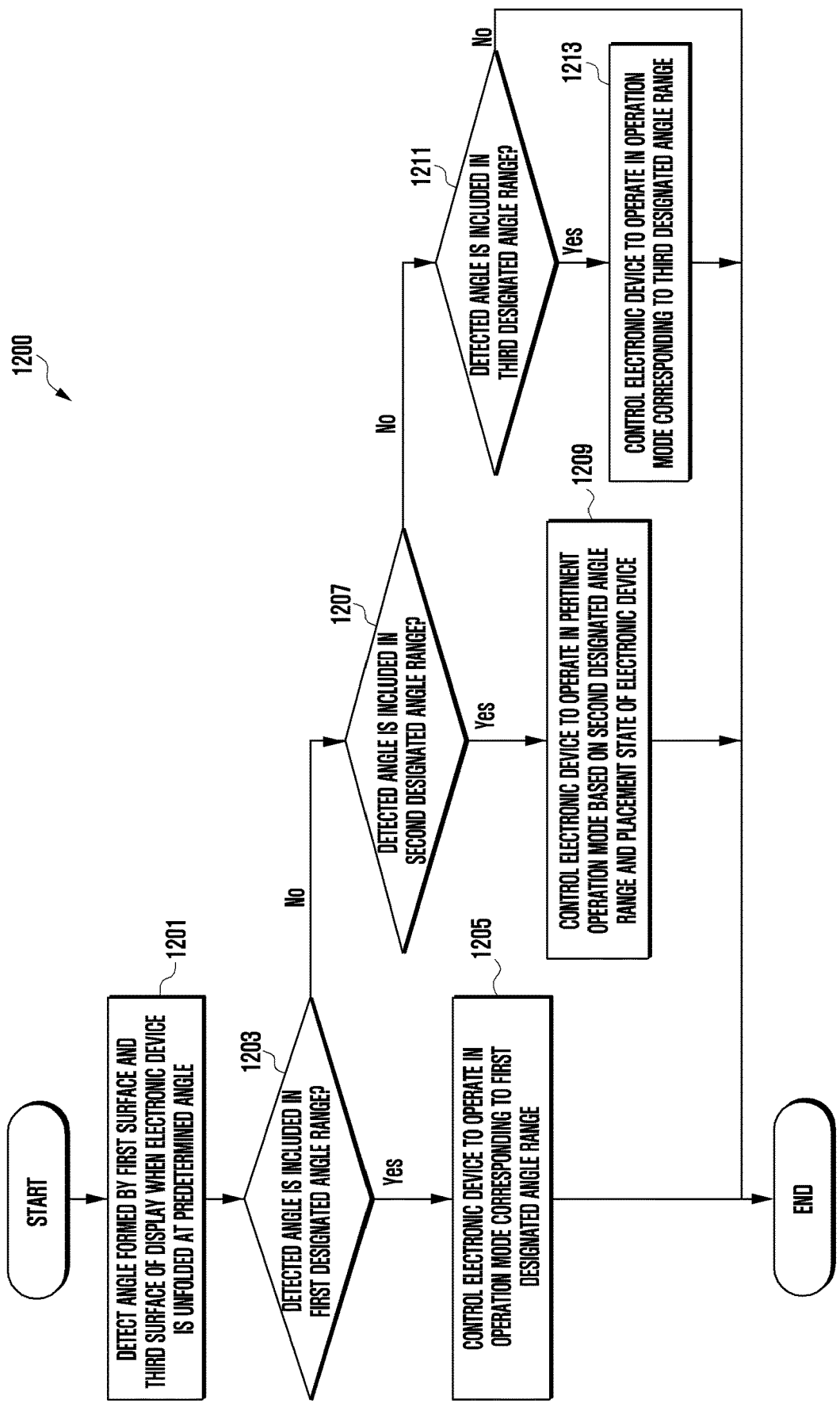
FIG. 12 is a flowchart for describing a method in which an electronic device operates in an operation mode determined based on a placement state of the electronic device and an angle formed by a first surface and a third surface of the electronic device according to an embodiment of the disclosure.

FIG. 12 is a flowchart for describing a method in which an electronic device operates in an operation mode determined based on a placement state of the electronic device and an angle formed by a first surface and a third surface of the electronic device according to an embodiment of the disclosure.

Referring to FIG. 12, in a method 1200, in operation 1201, when the electronic device 200 is unfolded at a predetermined angle, the electronic device 200 may detect an angle formed by a first surface (e.g., the first surface 211 in FIG. 2) and a third surface (e.g., the third surface 221 in FIG. 2) of the electronic device 200. In another embodiment, the electronic device 200 may detect an angle formed by a second surface (e.g., the second surface 212 in FIG. 2) and a fourth surface (e.g., the fourth surface 222 in FIG. 2) of the electronic device 200.

The electronic device 200 according to one embodiment may determine whether the detected predetermined angle is included in a designated angle range. For example, the designated angle range may include a first designated angle range, a second designated angle range, and a third designated angle range. According to one embodiment, a description will be made assuming that the first designated angle range is 0° to 80°, the second designated angle range is 90°±10°, and the third designated angle range is 100° or greater. The angle described above is presented to easily describe performing different modes based on angle values according to various embodiments, and is not limited to the angle values described above.

In one embodiment, in operation 1203, the electronic device 200 may determine whether the detected angle is included in the first designated angle range. When the detected angle is included in the first designated angle range, in operation 1205, the electronic device 200 may be controlled to operate in an operation mode corresponding to the first designated angle range. For example, if the electronic device 200 is unfolded at an angle included in the first designated angle range, this unfolded state (flat state) may indicate that a user does not want to show personal information to another user. In one embodiment, when the electronic device 200 is unfolded at an angle included in the first designated angle range regardless of a placement state of the electronic device 200, the electronic device 200 may be controlled to operate in an operation mode corresponding to the first designated angle range, for example, in a private mode. The private mode may include a mode for providing a user with an application related to personal authentication and/or security. For example, the application related to personal authentication and/or security may include a web surfing application or a bank application. In one embodiment, when the electronic device 200 operates in the private mode, the electronic device 200 may be controlled such that an input record and/or search history are not stored in the private mode.

In one embodiment, when the detected angle is not included in the first designated angle range, the electronic device 200 may determine, in operation 1207, whether the detected angle is included in the second designated angle range. When the detected angle is included in the second designated angle range, in operation 1209, the electronic device 200 may be controlled to operate in a pertinent operation mode (a first operation mode or a second operation mode), based on the second designated angle range and the placement state of the electronic device 200.

In one embodiment, if the placement state of the electronic device 200 is a first state while the electronic device 200 is unfolded at an angle included in the second designated angle range, this unfolded state may indicate that a user attempts to check the state of the face of the user. When the placement state of the electronic device 200 is the first state while the electronic device 200 is unfolded at the angle included in the second designated angle range, the electronic device 200 may execute a first operation mode corresponding to the first state and the second designated angle range, for example, a designated application (e.g., a mirror application).

In one embodiment, when the placement state of the electronic device 200 is a second state while the electronic device 200 is unfolded at an angle included in the second designated angle range, the electronic device 200 may recognize the state as a state in which a multimedia content is being executed or a state in which the electronic device 200 is put on a table (or the ground) without being used. For example, the state in which a multimedia content is being executed may include watching video, listening to music, or private broadcasting. The state in which the electronic device 200 is put on a table (or the ground) without being used may include a state in which the electronic device 200 is configured such that a user can view a notification of an event received in the electronic device 200 even while the user conducts other business. When the placement state of the electronic device 200 is the second state while the electronic device 200 is unfolded at the angle included in the second designated angle range, the electronic device 200 may turn on the first region 231a of the display 230 and may turn off the second region 231b of the display 230. When a multimedia content is being executed or when the electronic device 200 is placed on a table (or the ground) without being used by a user, power consumption may be reduced by turning off the second region 231b of the display 230.

In one embodiment, when the detected angle is not included in the second designated angle range, the electronic device 200 may determine, in operation 1211, whether the detected angle is included in the third designated angle range. When the detected angle is included in the third designated angle range, in operation 1213, the electronic device 200 may be controlled to operate in an operation mode corresponding to the third designated angle range. In one embodiment, when the electronic device 200 is unfolded at an angle included in the third designated angle range, the electronic device 200 may be controlled to operate in an operation mode corresponding to the third designated angle range regardless of a placement state of the electronic device 200. For example, when an input/output-related layout is displayed, the electronic device 200 may operate in the operation mode corresponding to the third designated angle range, for example, may display an input-related layout in the first region 231a of the display 230 and may display an output-related layout in the second region 231b of the display 230. For example, the input-related layout may include a keyboard layout, and the output-related layout may include a message writing screen layout.

Figure 13:
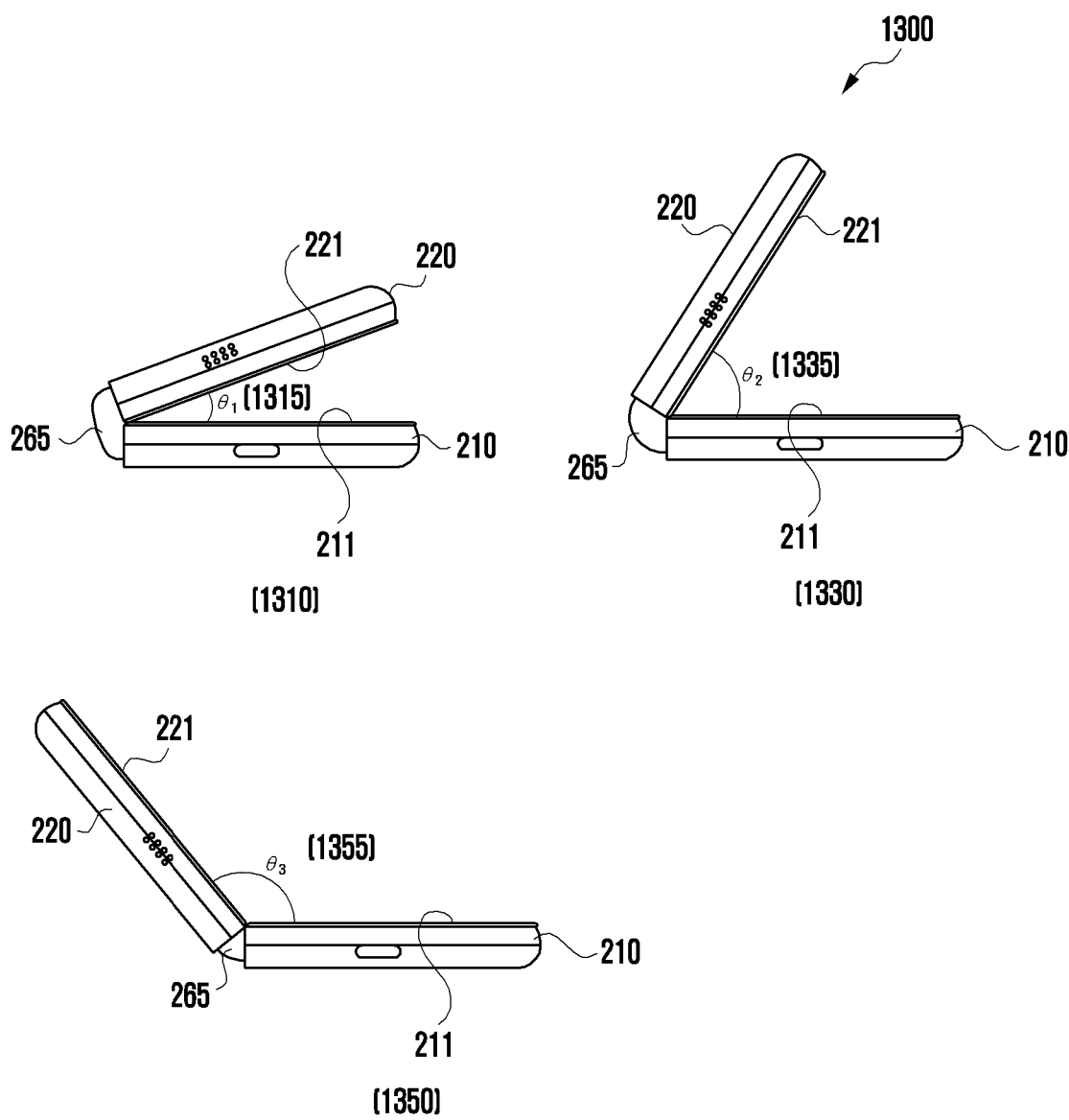
FIG. 13 is a view for describing a method in which an electronic device operates in an operation mode determined based on a placement state of the electronic device and an angle formed by a first surface and a third surface of the electronic device according to an embodiment of the disclosure.

FIG. 13 is a view for describing a method in which an electronic device operates in an operation mode determined based on a placement state of the electronic device and an angle formed by a first surface and a third surface of the electronic device, according to an embodiment of the disclosure.

In an embodiment according to FIG. 13, the electronic device 200 may be in a state in which the first surface (e.g., the first surface 211 in FIG. 2) and the third surface (e.g., the third surface 221 in FIG. 2) of the electronic device 200 are unfolded at a predetermined angle.

Referring to FIG. 13, in a view 1300, as illustrated by reference numeral 1310, the electronic device 200 may be in an unfolded state (flat state) at an angle (e.g., $\theta_1$ 1315) included in a first designated angle range (e.g., 0° to 80°). When the electronic device 200 is unfolded at the angle (e.g., $\theta_1$ 1315) included in the first designated angle range regardless of a placement state of the electronic device 200, the electronic device 200 may be controlled to operate in an operation mode corresponding to the first designated angle range, for example, in a private mode.

In one embodiment, as illustrated by reference numeral 1330, the electronic device 200 may be in an unfolded state (flat state) at an angle (e.g., $\theta_2$ 1335) included in a second designated angle range (e.g., 90°±10°). In the state in which the electronic device 200 is unfolded at the angle (e.g., $\theta_2$ 1335) included in the second designated angle range, the electronic device 200 may determine whether the placement state of the electronic device 200 is a first state or a second state. When the placement state of the electronic device 200 is the first state while the electronic device 200 is unfolded at the angle (e.g., $\theta_2$ 1335) included in the second designated angle range, the electronic device 200 may execute and display a designated application, for example, a mirror application. When the placement state of the electronic device 200 is the second state while the electronic device 200 is unfolded at the angle (e.g., $\theta_2$ 1335) included in the second designated angle range, the electronic device 200 may turn on the first region 231a of the display 230 to display a user interface therein, and may turn off the second region 231b of the display 230.

In one embodiment, as illustrated by reference numeral 1350, the electronic device 200 may be in an unfolded state (flat state) at an angle (e.g., $\theta_3$ 1355) included in a third designated angle range (e.g., 100° or greater). When the electronic device 200 is unfolded at the angle (e.g., $\theta_3$ 1355) included in the third designated angle range, the electronic device 200 may configure the first region 231a of the display 230 to be a region in which an input-related layout is displayed, and may configure the second region 231b of the display 230 to be a region in which an output-related layout is displayed. For example, the first region 231a of the display 230 may display a keyboard, and the second region 231b of the display 230 may display a message writing screen.

Figure 14:
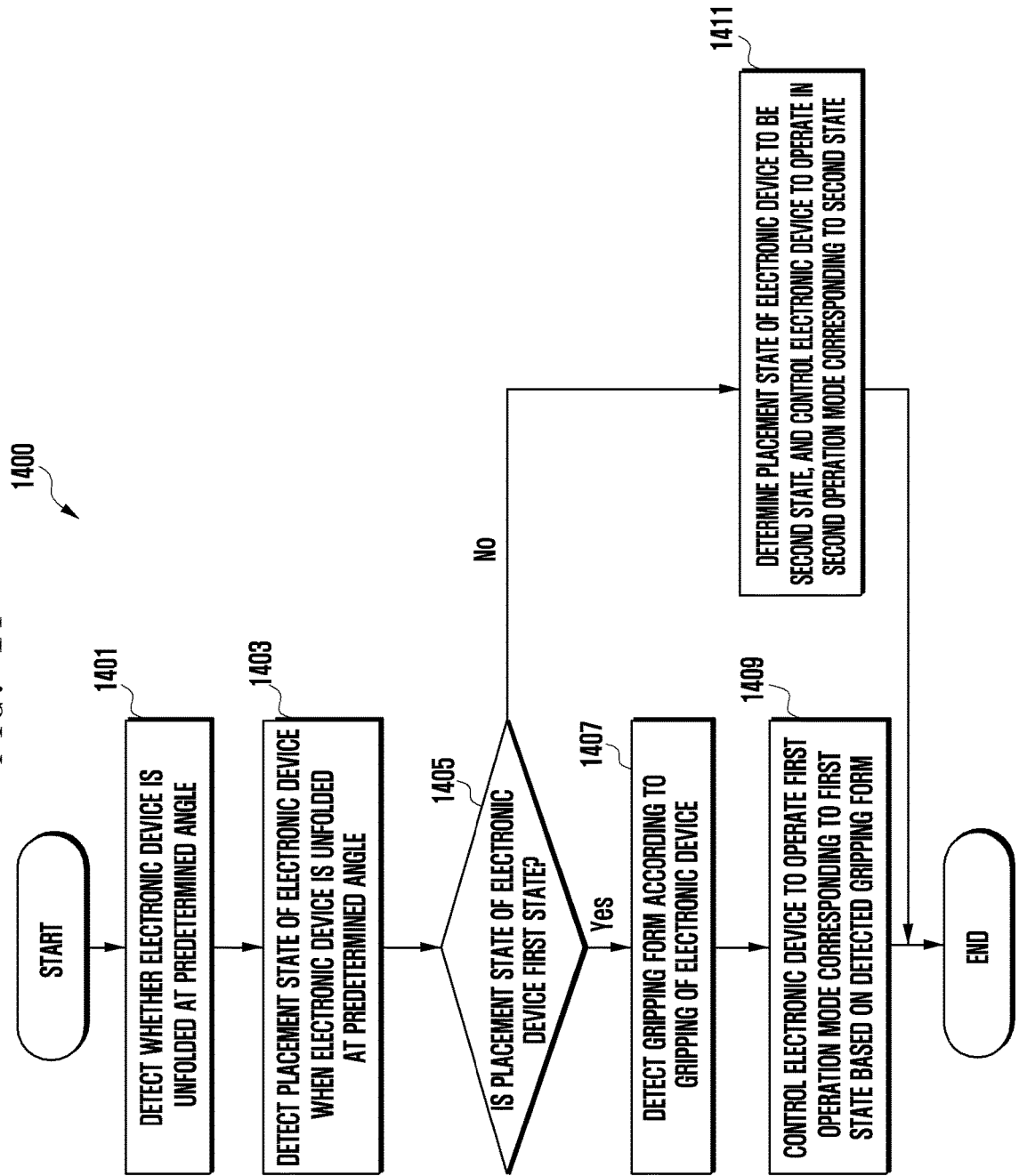
FIG. 14 is a flowchart for describing a method in which an electronic device operates in an operation mode determined based on a state in which the electronic device is unfolded at a predetermined angle, a placement state of the electronic device, and a gripping form according to gripping of the electronic device, according to an embodiment of the disclosure.

FIG. 14 is a flowchart for describing a method in which an electronic device operates in an operation mode determined based on a state in which the electronic device is unfolded at a predetermined angle, a placement state of the electronic device 200, and a gripping form according to gripping of the electronic device 200, according to an embodiment of the disclosure.

According to one embodiment, operations 1401 to 1405 in FIG. 14 are identical to operations 901 to 905 in FIG. 9. Thus, in connection with FIG. 14, only operations different from those of FIG. 9 will be described.

Referring to FIG. 14, in a method 1400, when the placement state of the electronic device 200 is determined to be a first state, in operation 1407, the electronic device 200 may detect a gripping form according to gripping of the electronic device 200.

In one embodiment, in operation 1409, the electronic device 200 may be controlled to operate in a first operation mode corresponding to the first state, based on the detected gripping form. The gripping form may be detected based on the contact position, the number of contacts, and/or the contact width with respect to each of multiple regions into which the side surfaces (e.g., the first side surface 213a, the second side surface 213b, the third side surface 213c, and the fourth side surface 223a in FIG. 2) and the rear surface (e.g., the first rear cover 240 or the second rear cover 250 in FIG. 2) of the electronic device 200 are divided.

According to one embodiment, a description will be made assuming that the first operation mode corresponding to the first state is, for example, a mode in which a layout corresponding to the first operation mode is displayed in a first region (e.g., the first region 231a in FIG. 2) and a second region (e.g., the second region 231b in FIG. 2) of a display (e.g., the display 230 in FIG. 2). The electronic device 200 may analyze the gripping form detected based on the contact position, the number of contacts, and/or the contact width with respect to each divided region, and may adjust and output, based on the analysis, a layout display region in the first region 231a of the display 230 and a layout display region in the second region 231b of the display 230.

In one embodiment, when the placement state of the electronic device 200 is not the first state, in operation 1411, the electronic device 200 may determine that the placement of the electronic device 200 is a second state, and may be controlled to operate in a second operation mode corresponding to the second state.

Figure 15:
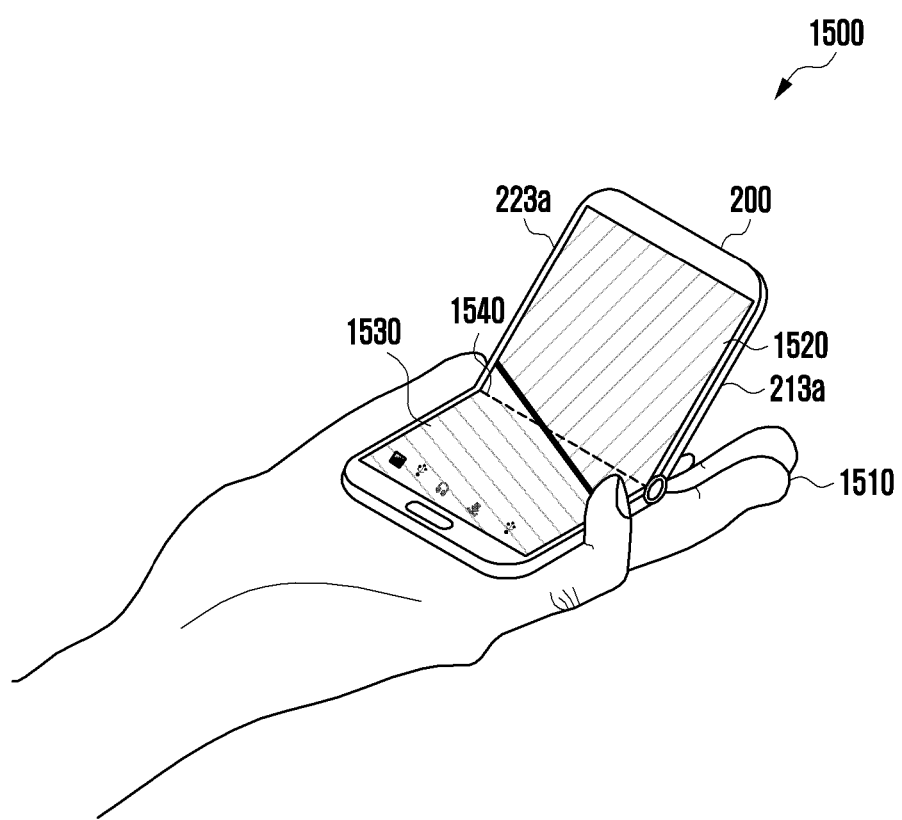
FIG. 15 is a view for describing a method in which an electronic device operates in an operation mode determined based on a state in which the electronic device is unfolded at a predetermined angle, a placement state of the electronic device, and a gripping form according to gripping of the electronic device, according to an embodiment of the disclosure.

FIG. 15 is a view for describing a method in which an electronic device operates in an operation mode determined based on a state in which the electronic device is unfolded at a predetermined angle, a placement state of the electronic device, and a gripping form according to gripping of the electronic device, according to an embodiment of the disclosure.

Referring to FIG. 15, in a view 1500, the electronic device 200 is unfolded at a predetermined angle, and the placement state of the electronic device 200 may be a first state, for example, a state in which a part (e.g., a rear cover) of the electronic device 200 is supported by the palm of a user and the side surfaces (e.g., the first side surface 213a, the second side surface 213b, the third side surface 213c, and the fourth side surface 223a in FIG. 2) of the electronic device 200 are gripped by fingers 1510 of the user. For example, the electronic device 200 may detect the state in which the rear cover (e.g., the first rear cover 240 in FIG. 2) of the electronic device 200 is in contact with a part of the palm of the user, and at least a part of the first side surface 213a of the electronic device 200 and at least a part of the fourth side surface 223a are gripped by the fingers.

In one embodiment, the electronic device 200 may not display a pertinent layout in each of a first region 1530 (e.g., the first region 231a in FIG. 2) and a second region 1520 (e.g., the second region 231b in FIG. 2), based on a folding axis (e.g., axis B in FIG. 5) 1540. Rather, on the basis of the position of fingers 1510 coming into contact with the first side surface 213a and the fourth side surface 223a of the electronic device 200, the electronic device 200 may differently configure the ratio (e.g., length/width display ratio) (e.g., a region in which lines are obliquely drawn from a right-upper side to a left-lower side) of a layout displayed in the first region 1530 of a display (e.g., the display 230 in FIG. 2) and the ratio (e.g., length/width display ratio) (e.g., a region in which lines are obliquely drawn from a left-upper side to a right-lower side) of a layout displayed in the second region 1520 of the display, and may then output the layouts.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a sensor circuit;
    a display;
    a processor operationally connected to the sensor circuit and the display; and
    a memory operationally connected to the processor,
    wherein the processor is configured to:
        detect, via the sensor circuit, whether the electronic device is unfolded at a predetermined angle,
        detect a placement state of the electronic device via the sensor circuit when the electronic device is unfolded at the predetermined angle,
        when the detected placement state of the electronic device is a first state, control the electronic device to operate in a first operation mode corresponding to the first state, wherein the first state is a state in which a movement of the electronic device is detected, and
        when the detected placement state of the electronic device is a second state, control the electronic device to operate in a second operation mode corresponding to the second state, wherein the second state is a state in which the movement of the electronic device is not detected, and
    wherein, when the detected placement state is the first state, the processor is further configured to:
        set a touch sensitivity of the first state to be higher than a touch sensitivity corresponding to the second state, and
        set a vibration sensitivity of the first state to be lower than a vibration sensitivity corresponding to the second state.

2. The electronic device of claim 1, further comprising a housing structure,
    wherein the housing structure comprises:
        a hinge structure which forms a folding region and comprises a hinge housing,
        a first housing structure which forms a first region, is connected to the hinge structure, and the first housing structure comprises a first surface, a second surface facing in a direction opposite to that of the first surface, and a first side surface member surrounding a first space between the first surface and the second surface, and
        a second housing structure which forms a second region, is connected to the hinge structure, and the second housing structure comprises a third surface, a fourth surface facing in a direction opposite to that of the third surface, and a second side surface member surrounding a second space between the third surface and the fourth surface,
    wherein the first housing structure and the second housing structure are foldably arranged along the hinge structure between a folded state and an unfolded state, and
    wherein the first surface and the third surface face in the same direction in the unfolded state, and the second surface and the fourth surface face in opposite directions in the folded state.

3. The electronic device of claim 2,
    wherein the display is configured to traverse from at least a part of the first surface to at least a part of the third surface via the folding region, and
    wherein the display comprises a first region disposed on the first surface and a second region disposed on the third surface.

4. The electronic device of claim 3, wherein the processor is further configured to:
    detect, via the sensor circuit, the predetermined angle formed by the first surface and the third surface and/or the predetermined angle formed by the second surface and the fourth surface, and
    control, based on the detected predetermined angle, the display to display a user interface according to the first operation mode or the second operation mode.

5. The electronic device of claim 3, wherein the processor is further configured to:
    detect, via the sensor circuit, a gripping form according to gripping of the electronic device when the detected placement state of the electronic device is the first state, and
    control, based on the detected gripping form, the electronic device to operate in the first operation mode corresponding to the first state.

6. The electronic device of claim 5, wherein the processor is further configured to control the electronic device to operate in the first operation mode for adjusting, based on the detected gripping form, a display region ratio of a layout of a user interface output in the first region of the display and the second region of the display.

7. The electronic device of claim 1,
    wherein the sensor circuit comprises an optical sensor, and
    wherein the processor is further configured to:
        obtain a distance between the electronic device and a user of the electronic device by using the optical sensor when the detected placement state of the electronic device is the first state, and control the electronic device to operate in the first operation mode corresponding to the first state when the obtained distance is included in a designated range.

8. The electronic device of claim 1, further comprising a camera,
wherein the processor is further configured to:
drive the camera when the detected placement state of the electronic device is the first state, and
control the electronic device to operate in the first operation mode corresponding to the first state when at least a part of a user's face is detected via the driven camera.

9. The electronic device of claim 8, wherein the processor is further configured to:
detect a direction of a user's line-of-sight via the driven camera, and
control the electronic device to operate in the first operation mode corresponding to the first state when it is determined that the detected user's line-of-sight is directed toward the display.

10. The electronic device of claim 1,
wherein the sensor circuit comprises multiple sensor circuits,
wherein the processor is further configured to:
obtain sensing information regarding a movement of the electronic device via the multiple sensor circuits when the electronic device is unfolded at the predetermined angle, and
determine, based on the obtained sensing information, whether the movement of the electronic device is detected,
wherein the first state comprises a state in which the movement of the electronic device is detected,
wherein the second state comprises a state in which the movement of the electronic device is not detected, and
wherein the multiple sensor circuits comprise at least one among an acceleration sensor, a gyro sensor, or a barometer sensor.

11. The electronic device of claim 1, wherein the first operation mode and the second operation mode are different in at least one of an application to be executed or a layout of a user interface to be output.

12. The electronic device of claim 1, wherein the first operation mode and second operation mode are based on a designated angle range of the electronic device.

13. A method for controlling an operation mode based on a state of an electronic device, the method comprising:
detecting, via a sensor circuit, whether the electronic device is unfolded at a predetermined angle;
detecting a placement state of the electronic device via the sensor circuit when the electronic device is unfolded at the predetermined angle;
when the detected placement state of the electronic device is a first state, controlling the electronic device to operate in a first operation mode corresponding to the first state, wherein the first state is a state in which a movement of the electronic device is detected; and
when the detected placement state of the electronic device is a second state, controlling the electronic device to operate in a second operation mode corresponding to the second state, wherein the second state is a state in which the movement of the electronic device is not detected,
wherein the method further comprises:
when the detected placement state is the first state,
setting a touch sensitivity of the first state to be higher than a touch sensitivity corresponding to the second state; and
setting a vibration sensitivity of the first state to be lower than a vibration sensitivity corresponding to the second state.

14. The method of claim 13, wherein the controlling of the electronic device to operate in the first operation mode and the controlling of the electronic device to operate in the second operation mode comprise:
detecting, via the sensor circuit, the predetermined angle formed by a first surface of the electronic device, on which a first region of a display is disposed, and a third surface of the electronic device, on which a second region of the display is disposed, and/or the predetermined angle formed by a second surface of the electronic device, which faces in a direction opposite to that of the first surface, and a fourth surface of the electronic device, which faces in a direction opposite to that of the third surface; and
displaying, based on the detected predetermined angle, a user interface according to the first operation mode or the second operation mode.

15. The method of claim 14, further comprising:
detecting, via the sensor circuit, a gripping form according to gripping of the electronic device when the detected placement state of the electronic device is the first state; and
controlling, based on the detected gripping form, the electronic device to operate in the first operation mode corresponding to the first state.

16. The method of claim 15, wherein the controlling, based on the detected gripping form, of the electronic device to operate in the first operation mode corresponding to the first state comprises adjusting a display region ratio of a layout of a user interface output in the first region of the display and the second region of the display, based on the detected gripping form.

17. The method of claim 13,
wherein the sensor circuit comprises an optical sensor, and
wherein the method further comprises:
obtaining a distance between the electronic device and a user of the electronic device via the optical sensor when the detected placement state of the electronic device is the first state; and
controlling the electronic device to operate in the first operation mode corresponding to the first state when the obtained distance is included in a designated range.

18. The method of claim 13, further comprising:
driving a camera when the detected placement state of the electronic device is the first state; and
controlling the electronic device to operate in the first operation mode corresponding to the first state when at least a part of a user's face is detected via the driven camera.

19. The method of claim 18, further comprising:
detecting a direction of a user's line-of-sight via the driven camera; and
controlling the electronic device to operate in the first operation mode corresponding to the first state when it is determined that the detected user's line-of-sight is directed toward the display of the electronic device.

20. The method of claim 13,
wherein the sensor circuit comprises multiple sensor circuits, wherein the method further comprises:
  obtaining sensing information regarding a movement of the electronic device via the multiple sensor circuits when the electronic device is unfolded at the predetermined angle; and
  determining, based on the obtained sensing information, whether the movement of the electronic device is detected,
wherein the first state comprises a state in which the movement of the electronic device is detected, and
wherein the second state comprises a state in which the movement of the electronic device is not detected.

21. The method of claim 13, wherein the first operation mode and the second operation mode are different in at least one of an application to be executed or a layout of a user interface to be output.

* * * * *